United States Patent
Suzuki et al.

[11] Patent Number: 6,085,240
[45] Date of Patent: Jul. 4, 2000

[54] AGENT IDENTIFICATION DEVICE, AGENT DEVICE WITH PROGRAM RECEPTION FUNCTION, AND NETWORK SYSTEM

[75] Inventors: Motohiro Suzuki; Yoshiaki Kiriha, both of Tokyo, Japan

[73] Assignee: NEC Corporation, Tokyo, Japan

[21] Appl. No.: 09/033,755

[22] Filed: Mar. 3, 1998

[51] Int. Cl.[7] .................................................. G06F 13/00
[52] U.S. Cl. ............................................................ 709/223
[58] Field of Search ....................... 364/DIG. 1, DIG. 2; 709/200, 202, 203, 213, 214, 215, 216, 217, 220, 221, 222, 223, 224

[56] References Cited

U.S. PATENT DOCUMENTS

| | | | |
|---|---|---|---|
| 5,367,635 | 11/1994 | Bauer et al. | 709/221 |
| 5,655,081 | 8/1997 | Bonnell et al. | 709/202 |
| 5,678,066 | 10/1997 | Valizudeh et al. | 709/200 |

FOREIGN PATENT DOCUMENTS

| | | |
|---|---|---|
| 5-282230 | 10/1993 | Japan . |
| 6-28164 | 2/1994 | Japan . |
| 6-175955 | 6/1994 | Japan . |
| 6-223020 | 8/1994 | Japan . |
| 8-297648 | 11/1996 | Japan . |
| 8-298505 | 11/1996 | Japan . |
| 6-131200 | 5/1999 | Japan . |

*Primary Examiner*—Robert B. Harrell
*Attorney, Agent, or Firm*—Scully, Scott, Murphy & Presser

[57] ABSTRACT

An agent identification device that identifies an agent device that dynamically transmits a program to another agent device by flexibly dealing with various managed functions and changes in condition of a network supplied by the agent device. The agent identification device includes a retrieval rule evaluation section and a communication address retrieval section. The retrieval rule evaluation section has the function of deriving the identifier of an agent device to which a program is next transmitted, based on input data, and the function of storing a retrieval rule being a program for deriving the identifier of the agent device and information used to evaluate the retrieval rule. The communication address retrieval section has the function of deriving the communication address of the agent device to which a program is next transmitted, by inputting an output from the retrieval rule evaluation section, and the function of storing DN-communication address conversion information in which the correspondence between the output of the retrieval rule evaluation section and the communication address is described.

23 Claims, 19 Drawing Sheets

AGENT IDENTIFICATION DEVICE, AGENT DEVICE WITH PROGRAM RECEPTION FUNCTION, AND NETWORK SYSTEM

BACKGROUND OF THE INVENTION

The present invention relates to an agent device with program reception function used for a network management, and more particularly to an agent device identification device that automatically derives an agent device to be next transmitted for a program. The present invention also relates to a network system including agent devices.

Referring to FIG. 2 representing an example of the above-described agent device introduced by one of papers contributed to General Conference of Electronic Information Communication Society held on March, 1996 (communication 2B-900) titled "Agent adapting the delegation—dynamic script binding", the agent device is designed to execute a script describing management operations (hereinafter referred to as a program) sent from a device executing network management (hereinafter referred to as a manager) on a device for executing actual management (hereinafter referred to as an agent device).

FIG. 18 shows an example of a conventional agent device. Referring to FIG. 18, the agent device 3401 comprises a program execution section 3402 and a program execution information memory section 3404.

The program execution section 3402 comprises, for example, a program S1 transmitted from a manger M1 and being executed and access control means 3403 for preventing execution of the illegal instruction contained in the program S1 being executed. FIG. 18 shows only three managers M1, M2 and M3 and one program S1 being executed. However, plural managers M1 to Mk (k is an integer) and plural programs S1 to Sm (m is an integer) being executed can be used for any actual cases.

The program execution information memory section 3404 has a function of storing managed operational objects O1 and O2. Although FIG. 18 shows only two managed operational objects O1 and O2, there can be plural managed operational objects O1 to On (n is an integer) existing in the actual system.

Each of the managed operational objects O1 and O2 has a function for supplying the script describing management operation inherent in the agent device to the program S1 being executed through an application program interface (hereinafter referred to as API) providing the managed object operation. The managed operation objects O1 and O2 retrain delegation of the operation to the respective managed objects for accessing (read-only, read and write enabled and non-accessible).

Referring to FIG. 19, the operation of the above-constructed conventional agent device 3401 is described.

For example, it is assumed that the program execution section 3402 of the agent device 3401 receives the program S1 from the manager M1 (step S3501). Then the access control means 3403 checks whether each operation delegation held by the managed operational objects O1 and O2 deviates from the management delegation preliminarily assigned to the manger M1 (step S3502).

It is further judged whether or not the operation delegations of all the managed operational objects O1 and O2 do not deviate (step S3503). When the result at step S3503 shows that there is no deviation with respect to all the managed operational objects O1 and O2, the program execution section 3402 links the required managed operational objects O1 and O2 (step S3504). Then the program S1 enabled by the result at step S3504 is executed (step S3505). The program execution section 3402 returns the execution result to the manager M1 (step S3507).

If at least one deviation of the management delegation is designed at step S3503, the program execution section 3402 stops execution of the program S1 and outputs an error (step S3506). The program execution section 3402 returns the execution result to the manager M1 (step S3507).

For the aftermentioned conventional art, it is very difficult to realize the managed operational objects O1 and O1. This is because that the sequence from access to achieve the management function with respect to the managed object is realized within each of management operational objects O1 and O2.

SUMMARY OF THE INVENTION

The present invention is made to solve the above-mentioned problems. The objective of the present invention is to provide an agent identification device that identifies an agent device that dynamically transmits a program to another agent device by flexibly dealing with various management functions and changes in condition of a network supplied by an agent device.

Another objective of the present invention is to provide an agent device with program reception function.

Still another objective of the present invention is to provide a network system including an agent device.

The objective of the present invention is achieved by an agent device identification device comprising a retrieval rule evaluation section for storing a retrieval rule for identifying an agent device and network information for evaluating the retrieval rule, and identifying an agent device to which a program is transmitted by using the retrieval rule and, if necessary, the network information, and outputting an identifier of an agent device identified; and a communication address retrieval section for storing conversion information in which a correspondence between the identifier and an communication address is described and for deriving a communication address of an agent device to which a program is next transmitted by using the identifier and the conversion information input from the retrieval rule evaluation section.

According to the agent device identification device of the present invention, the network information includes network configuration information being physical location information between transmitters, an inclusion relation of a managed object, and pointer information indicating other managed object held by a managed object.

According to the agent device identification device of the present invention, the retrieval rule is a program for outputting a distinguished name for identifying an agent device which next transmits a management function execution request and a parameter needed when a target agent device executes a required management function, based on a relation between managed objects used in a management function.

Moreover, according to the present invention, an agent device with program reception function comprises a program execution information storage section for storing an enhanced operational object which realizes management functions in a network management to provide the management functions to a program and a primitive operational object which provides a function of accessing a managed object, to the enhanced operational object; a program execution section having means of executing a program transmitted from a manager, means of linking an enhanced operational object required by the program during a program execution to the program, and means of transmitting an execution result of the program to the manager; a management information storage section for storing the managed object; an agent identification device for identifying another agent device transmitting an execution request of the management function when the enhanced operational object needs to transmit a management function execution request to the agent device; and a remote function execution section having means of issuing a management function execution request to another agent device decided by the agent identification device and means of executing a required enhanced operational object when another agent device requires executing a management function.

According to the agent device with program reception function of the present invention, the agent identification device comprises retrieval rule evaluation means for storing a retrieval rule for identifying an agent device and network information for evaluating the retrieval rule, identifying an agent device to which a program is transmitted using the retrieval rule and, if necessary, the network information, and outputting the identifier of an identified agent device; and communication address retrieval means for storing conversion information in which the correspondence between the identifier and a communication address is described, and deriving the communication address of an agent device to which a program is next transmitted, using the identifier and the conversion information input from the retrieval rule evaluation section.

According to the agent device identification device with program reception function of the present invention, the network information includes network configuration information being physical location information between transmitters, an inclusion relation of a managed object, and pointer information indicating other managed object held by a managed object.

According to the agent device identification device of the present invention, the retrieval rule is a program for outputting a distinguished name for identifying an agent device which next transmits a management function execution request and a parameter needed when a target agent device executes a required management function, based on a relation between managed objects used in a management function.

Furthermore, according to the present invention, an agent device with program reception function comprises a program execution information storage section for storing an enhanced operational object which realizes management functions in a network management to provide the management functions to a program and a primitive operational object which provides a function of accessing a managed object, to the enhanced operational object; a program execution section having means of executing a program transmitted from a manager, means of linking an enhanced operational object required by the program during a program execution to the program, and means of transmitting an execution result of said program to the manager; a management information storage section for storing the managed object; an agent identification device for identifying another agent device transmitting an execution request of the management function when the enhanced operational object needs to transmit a management function execution request to the agent device; and a remote function execution section having means of issuing a management function execution request to another agent device decided by the agent identification device, means of executing a required enhanced operational object when another agent device requires executing a management function, and means of transmitting and receiving an enhanced operational object between agent devices.

According to the agent device with program reception function of the present invention, the agent identification device comprises retrieval rule evaluation means for storing a retrieval rule for identifying an agent device and network information for evaluating the retrieval rule, identifying an agent device to which a program is transmitted using the retrieval rule and, if necessary, the network information, and outputting the identifier of an identified agent device; and communication address retrieval means for storing conversion information in which the correspondence between the identifier and a communication address is described, and deriving the communication address of an agent device to which a program is next transmitted, using the identifier and the conversion information input from the retrieval rule evaluation section.

According to the agent device identification device with program reception function of the present invention, the network information includes network configuration information being physical location information between transmitters, an inclusion relation of a managed object, and pointer information indicating other managed object held by a managed object.

According to the agent device identification device of the present invention, the retrieval rule is a program for outputting a distinguished name for identifying an agent device which next transmits a management function execution request and a parameter needed when a target agent device executes a required management function, based on a relation between managed objects used in a management function.

Moreover, according to the present invention, an agent device with program reception function comprises a program execution information storage section for storing an enhanced operational object which realizes management functions in a network management to provide the management functions to a program, a primitive operational object which provides a function of accessing a managed object, to the enhanced operational object, a managed object access object having a function of directly accessing one managed object, and a standard enhanced operational object of providing a management function using a function possessed by said managed object access object; a program execution section having means of executing a program transmitted from a manager, means of linking an enhanced operational object required by the program during a program execution to said program, and means of transmitting an execution result of the program to the manager; a management information storage section for storing the managed object; an agent identification device for identifying another agent device transmitting an execution request of the management function when the enhanced operational object needs to transmit a management function execution request to the agent device; and a remote function execution section having means of issuing a management function execution request to another agent device decided by the agent identification device, means of executing a required enhanced operational object when another agent device requires executing a management function, and means of communicating with a standard enhanced operational object server which stores the standard enhanced operational object and then dynamically capturing the standard enhanced operational object.

According to the agent device with program reception function of the present invention, the agent identification device comprises retrieval rule evaluation means for storing a retrieval rule for identifying an agent device and network information for evaluating the retrieval rule, identifying an agent device to which a program is transmitted using the retrieval rule and, if necessary, said network information, and outputting the identifier of an identified agent device; and communication address retrieval means for storing conversion information in which the correspondence between the identifier and a communication address is described, and deriving the communication address of an agent device to which a program is next transmitted, using the identifier and the conversion information input from the retrieval rule evaluation section.

According to the agent device identification device with program reception function of the present invention, the network information includes network configuration information being physical location information between transmitters, an inclusion relation of a managed object, and pointer information indicating other managed object held by a managed object.

According to the agent device identification device of the present invention, the retrieval rule is a program for outputting a distinguished name for identifying an agent device which next transmits a management function execution request and a parameter needed when a target agent device executes a required management function, based on a relation between managed objects used in a management function.

Moreover, according to the present invention, a network system comprises a name resolution server for identifying another agent device which transmits a management function execution request when it is needed that an enhanced operational object transmits the management function execution request to the another agent device; a program execution information storage section for storing an enhanced operational object which realizes management functions in a network management to provide the management functions to a program and a primitive operational object which provides a function of accessing a managed object, to the enhanced operational object; a program execution section having means of executing a program transmitted from a manager, means of linking an enhanced operational object required by the program during a program execution to the program, and means of transmitting an execution result of the program to said manager; a management information storage section for storing the managed object; an agent identification device for identifying another agent device transmitting an execution request of the management function when the enhanced operational object needs to transmit a management function execution request to the agent device; and a remote function execution section having means of issuing a management function execution request to another agent device decided by the agent identification device, means of executing a required enhanced operational object when another agent device requires executing a management function, and means of establishing communications via the name resolution server and a network.

According to the network system of the present invention, the name resolution server comprises retrieval rule evaluation means for storing a retrieval rule for identifying an agent device and network information for evaluating the retrieval rule, identifying an agent device to which a program is transmitted using the retrieval rule and, if necessary, the network information, and outputting the identifier of an identified agent device; and communication address retrieval means for storing conversion information in which the correspondence between the identifier and a communication address is described, and deriving the communication address of an agent device to which a program is next transmitted, using the identifier and the conversion information input from the retrieval rule evaluation section.

According to the network system of the present invention, the network information includes network configuration information being physical location information between transmitters, an inclusion relation of a managed object, and pointer information indicating other managed object held by a managed object.

According to the network system of the present invention, the retrieval rule is a program for outputting a distinguished name for identifying an agent device which next transmits a management function execution request and a parameter needed when a target agent device executes a required management function, based on a relation between managed objects used in a management function.

Moreover, according to the present invention, a network system comprises a name resolution server for identifying another agent device which transmits a management function execution request when it is needed that an enhanced operational object transmits the management function execution request to the another agent device; a program execution information storage section for storing an enhanced operational object which realizes management functions in a network management to provide the management functions to a program, a primitive operational object which provides a function of accessing a managed object, to the enhanced operational object, a managed object access object having a function of directly accessing one management function, and a standard enhanced operational object of providing a management function by using a function possessed by the managed object access object; a program execution section having means of executing a program transmitted from a manager, means of linking an enhanced operational object required by the program during a program execution to the program, and means of transmitting an execution result of the program to the manager; a management information storage section for storing the managed object; an agent identification device for identifying another agent device transmitting an execution request of the management function when the enhanced operational object needs to transmit a management function execution request to the agent device; and a remote function execution section having means of issuing a management function execution request to another agent device decided by the agent identification device, means of executing a required enhanced operational object when another agent device requires executing a management function, means of communicating with the standard enhanced operational object server which stores the standard enhanced operational object and then dynamically capturing the standard enhanced operational object, and means of establishing communications via the name resolution server and a network.

According to the network system of the present invention, the name resolution server comprises retrieval rule evaluation means for storing a retrieval rule for identifying an agent device and network information for evaluating the retrieval rule, identifying an agent device to which a program is transmitted using the retrieval rule and, if necessary, the network information, and outputting the identifier of an identified agent device; and communication address retrieval means for storing conversion information in which the correspondence between the identifier and a communication address is described, and deriving the communication address of an agent device to which a program is next transmitted, using the identifier and the conversion information input from the retrieval rule evaluation section.

According to the network system of the present invention, the network information includes network configuration information being physical location information between transmitters, an inclusion relation of a managed object, and pointer information indicating other managed object held by a managed object.

According to the network system of the present invention, the retrieval rule is a program for outputting a distinguished name for identifying an agent device which next transmits a management function execution request and a parameter needed when a target agent device executes a required management function, based on a relation between managed objects used in a management function.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments of the present invention will be described below in detail with reference to the attached drawings.

Figure 1:
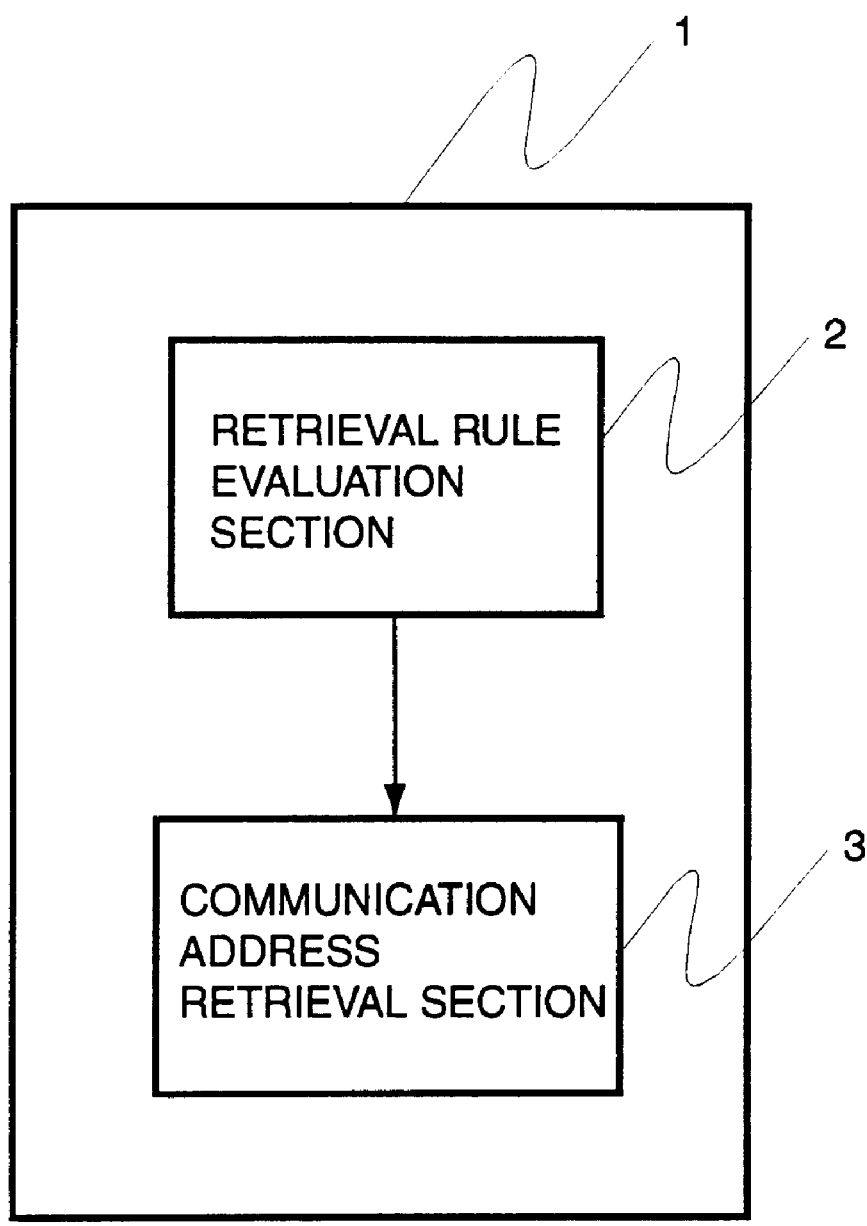
FIG. 1 is a block diagram illustrating the configuration of an agent device identification device according to the present invention.

FIG. 1 shows a block diagram illustrating the configuration of an agent device identification device 1 according to the first embodiment of the present invention. The agent device identification device 1 has a retrieval rule evaluation section 2 having the function of deriving the identifier of an agent device to which a program is next transmitted based on input data, and the function of storing a retrieval rule being a program for deriving the identifier of an agent device and information used in the retrieval rule evaluation (hereinafter referred to as network information), and a communication address retrieval section 3 having the function of deriving a communication address of an agent device to which a program is next transmitted as the output from the retrieval rule evaluation section, and the function of storing DN-communication address conversion information describing correspondences between the output of the retrieval rule evaluation section 2 and the communication address.

The network information is stored in the retrieval rule evaluation section 2. The network information includes network configuration information being physical location information between transmitters and pointer information designating an inclusion relation of a managed object and another managed object holding a managed object.

The retrieval rule is stores in the retrieval rule evaluation section 2. The retrieval rule is a program for outputting DN for identifying an agent device which next transmits a management function execution request (hereinafter referred to as identification DN) and a parameter used when a target agent device executes a required management function, based on the relation between managed objects used in the management function. For example, the retrieval rule regarding the function of tracing a virtual path (hereinafter referred to as VP) in an asynchronous transfer mode network (hereinafter referred to as ATM network) is as follows:

1. if (upstreamConnectivityPointer attribute of vpTTPBidirectional managed object given as a parameter cannot be obtained) {
2. return error;
3. } else {
4. (VPI is obtained by accessing ingressVPI attribute vpCTPBidirectional management object)
5. (DN of AdaptorTTPBidirectional managed object is created based on DN of vpCTPBidirectional managed object);
6. (DN of vc4TTPBidirectional managed object is obtained by accessing supportedByObjectList attribute of tcAdaptorBidirectional managed object);
7. (DN of au4CTPBidirectional managed object is obtained by accessing upstreamConnectivityPointer attribute of vc4TTPBidirectional managed object);
8. (DN of msTTPBidirectional managed object is created based on au4CTPBidirectional managed object);
9. (DN of msCTPBidirectionl managed object is obtained by accessing upstreamConnectivityPointer attribute of msTTPBidirectional managed object);

10. (DN of rsTTPBidirectional managed object is created by based on DN of msCTPBidirectional managed object);

11. (DN of rsCTPBidirectional managed object is obtained by accessing upstreamConnectivityPointer attribute of rsTTPBidirectional managed object);

12. (DN of opticalSPITTPBidirectinal managed object is created based on DN of rsCTPBidirectional managed object);

13. DN of networkTTPBidirectional managed object is obtained by accessing networkLevelPointer attribute of opticalSPITTPBidirectional managed object);

14. (DN of trail managed object is obtained by accessing upstreamConnectivityPointer attribute of networkTTPBidirectional managed object);

15. (DN of trail managed object is regarded as identification DN);

16. return (DN of trail managed object and ingressVPI attribute value of vpCTPBidirectional managed object);

17. }

According to the retrieval rule, DN of vpTTPBidirectional managed object is received as an input. Identification DN is handled as DN of trail managed object. DN of trail managed object and ingressVPI attribute value of vpCTP-Bidirectional managed object are output as a parameter which enables a path trace function in a remote agent device to be executed.

DN to communication address conversion information, which is stored in the communication address retrieval section 3, is a table for the correspondence between the communication address of an agent device and an identification DN output according to the retrieval rule. For example, the correspondence between DN of the trail managed object and an IP address being a communication address of an agent device is written in this table.

Next, the operation of the agent device identification device with the above-mentioned configuration will be described below by referring to the drawings.

Figure 2:
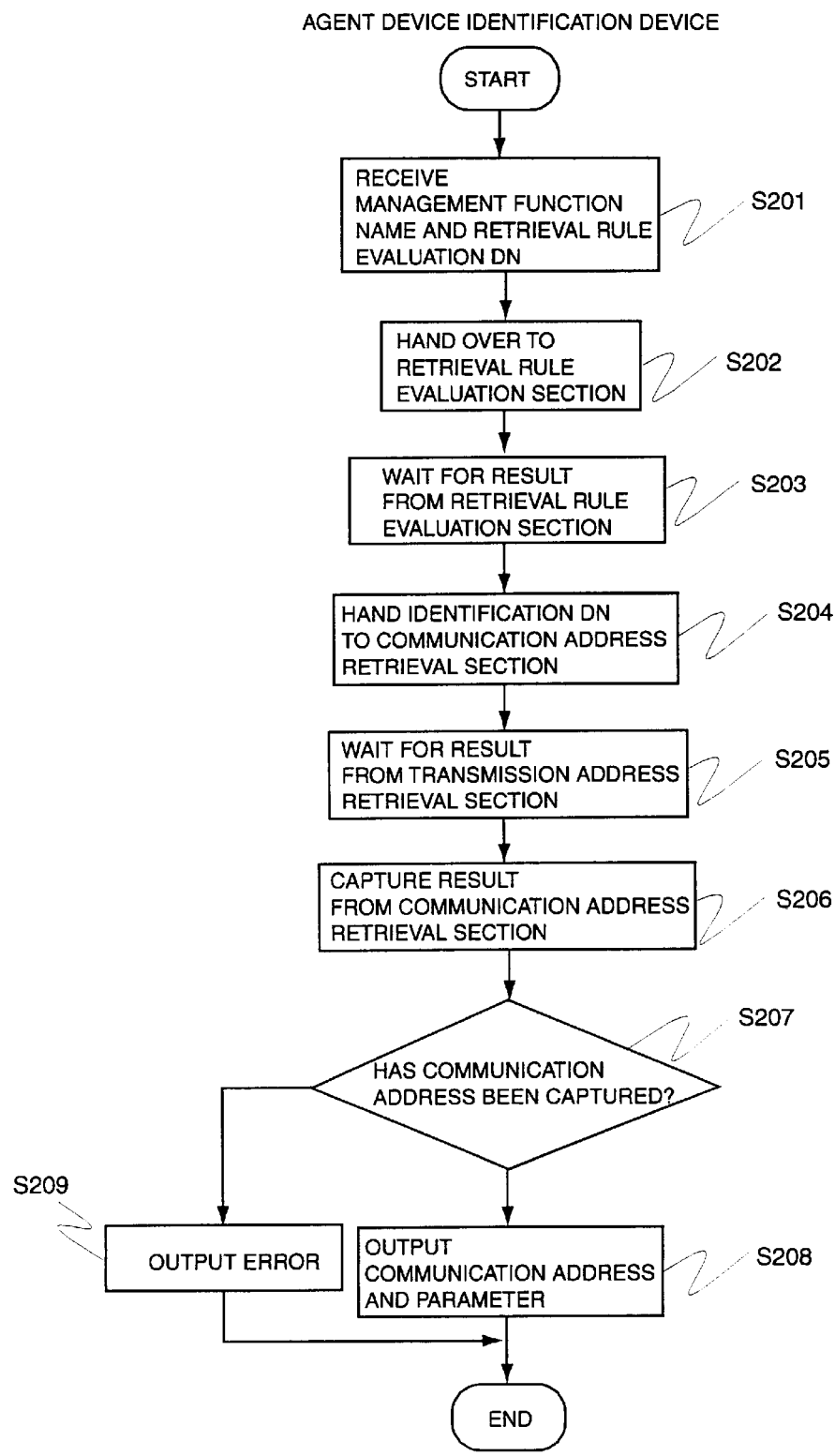
FIG. 2 is a flow chart illustrating the operation of the agent device identification device of FIG. 1.

FIG. 2 is a flow chart illustrating the operation of the agent device identification device 1.

It is now assumed that the agent device identification device 1 receives a management function name to be executed by a remote agent device and parameters required to identify a target agent device (step S201). When an ATM network, for example, executes a path trace function, DN of vpTTPBidirectional managed object showing the termination of VP to be traced is used as a parameter needed for identification of the agent device.

Next, the management function name and the parameter received in the step S201 are handed to the retrieval rule evaluation section 2 (step S202). Thereafter, the result from the retrieval rule evaluation section 2 is waited (step S203).

Figure 3:
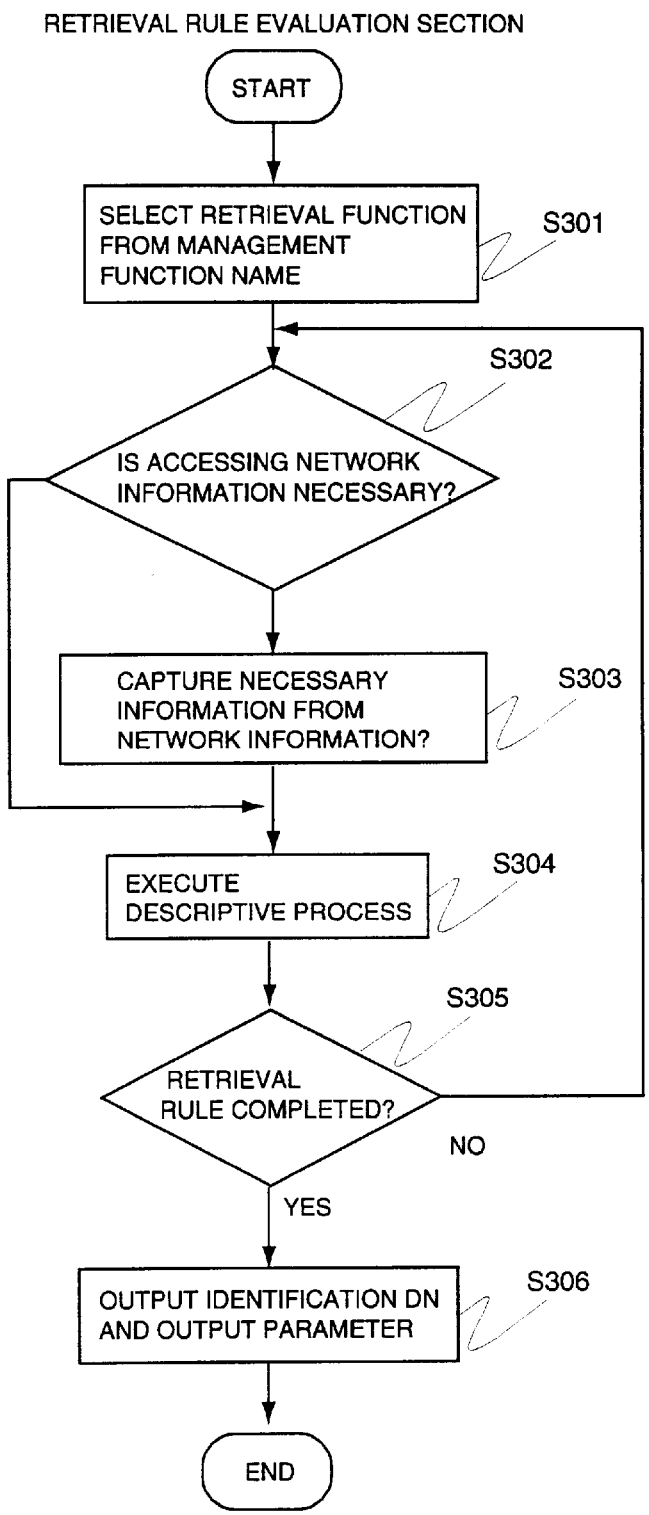
FIG. 3 is a flow chart illustrating the operation of the retrieval rule evaluation section of FIG. 1.

Next, the retrieval rule evaluation section 2 begins the operation shown in FIG. 3.

The retrieval rule evaluation section 2 selects the retrieval from management function names received as input data (step S301). Where the path trace function retrieval rule, for example, is evaluated, the management function name is "path trace".

Next, the retrieval rule evaluation section 2 begins to evaluate the retrieval rule selected in the step S301 by using the input parameter. The parameter is DN of vpTTBidirectional managed object showing the termination of the path to be traced. At this time, the retrieval rule evaluation section 2 checks whether or not it is needed to capture the management information by accessing network information (step S302).

When the result in the step S302 shows that access to network information is needed, necessary management information is captured from the network information (step S303).

When the result in the step S302 shows that access to network information is not needed or the result in the step S303 shows that necessary management information has been captured, the process described in the retrieval rule is executed (step S304).

Next, whether or not the retrieval rule has been ended is checked (step S305).

Where the result in the step S305 shows the retrieval rule has not been ended, the flow is repeated from the step S302.

Where the result in the step S305 shows that the retrieval rule has been ended, the identification DN and the output parameter are output (step S306). The designation of the identification DN or the output parameter is described in the retrieval rule. Where the path trace function retrieval rule, for example, is used, the identification DN is regarded as DN of a trail managed object. Where the agent device executes the path trace function, DN of a trail managed object and ingressVPI attribute value of vpCTPBidirectional managed object are output as necessary parameter.

The following operation of the agent device identification device 1 is as follows:

According to the result in the step S203, the captured retrieval rule evaluation section 2 hands its output to the communication retrieval section 3 (step S204). Then, the agent device identification device 1 waits for the result from the communication address retrieval section 3 (step S205).

Figure 4:
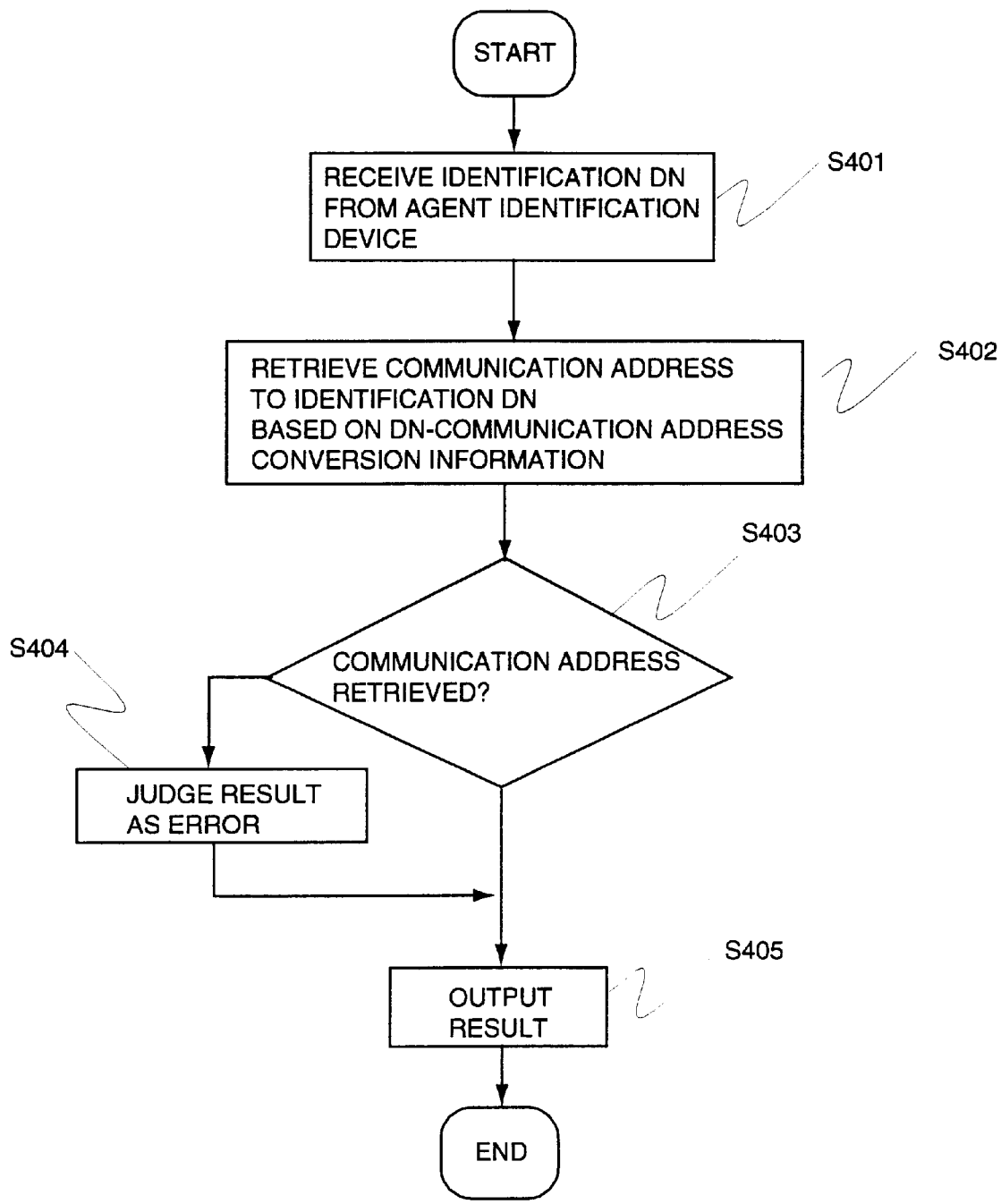
FIG. 4 is a flow chart illustrating the operation of the communication address conversion section of FIG. 1.

Next, the operation of the identification address retrieval section 3 begins to operate as shown in FIG. 4.

First, the communication address retrieval section 3 receives identification DN from the agent identification device 1 (step S401).

Next, the communication to the identification DN is retrieved based on the DN to communication address conversion information (step S402). At this time, the retrieved communication address is, for example, IP address.

According to the result in the step S402, whether or not the communication address has been retrieved is checked (step S403).

According to the result in the step S403, when the communication address has not been retrieved, it is regarded that the output result is erroneous (step S404).

According to the result in the step S402 or S443, the captured result is output (step S405).

The successive operation of the agent device identification device 1 is as follows:

The agent device identification device 1 captures the result from the communication address retrieval section 3 (step S206).

Next, whether or not the captured result from the communication address retrieval section 3 is the communication address is checked (step S207).

Where the captured result in the step S207 is a communication address, the parameter captured in the step S207 is output together with the communication address captured in the step S206 (step S208). Where the captured result in the step S207 is not the communication address, the agent device identification device 1 outputs an error message (step S209).

Next, the case where the agent device identification device 1 is applied to an agent device with program reception function will be described below with reference to figures.

Figure 5:
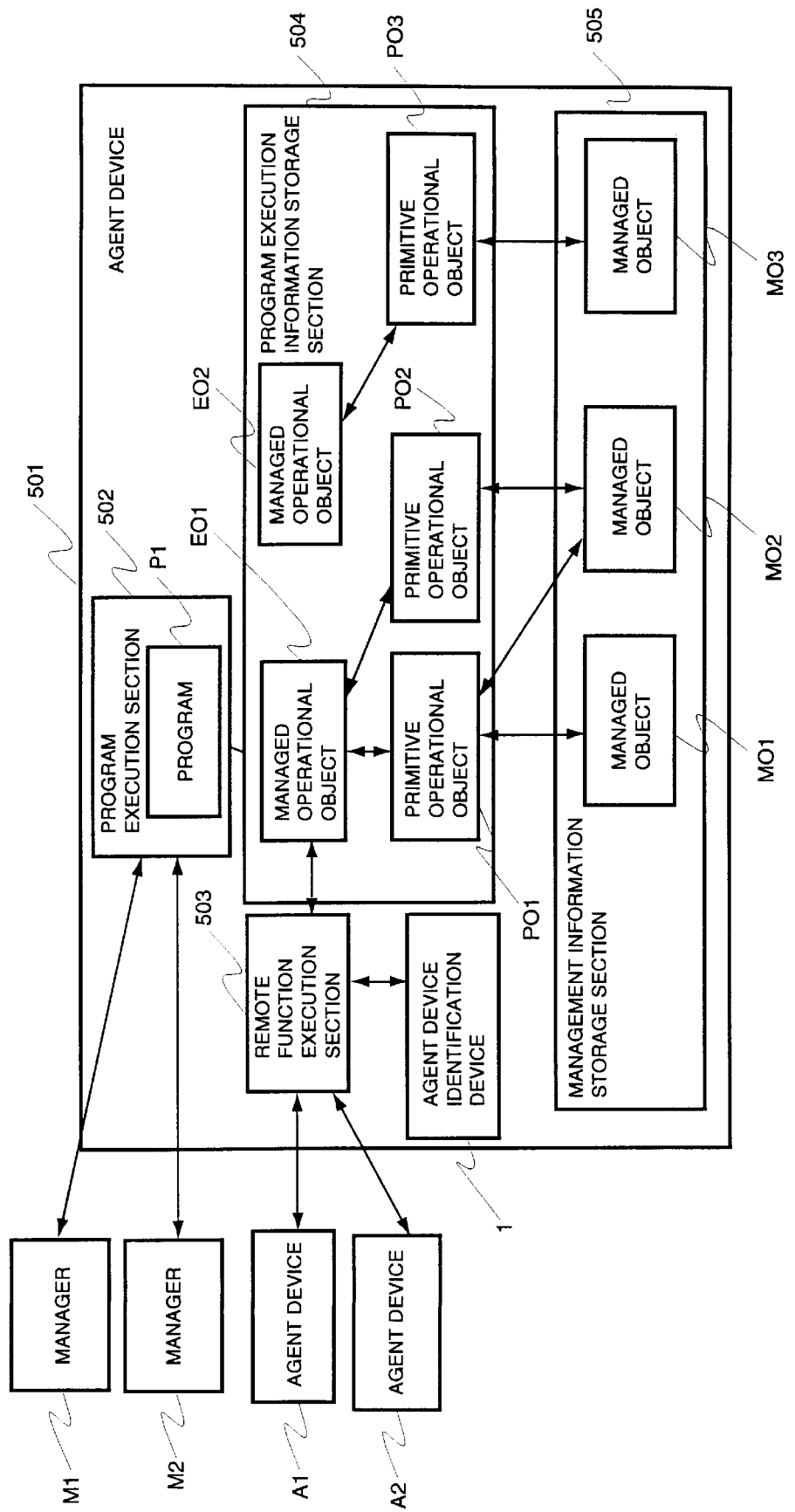
FIG. 5 is a block diagram illustrating the configuration of an agent device according to the first embodiment where the agent device identification device of the present invention is applied to an agent device with program reception function.
Figure 6:
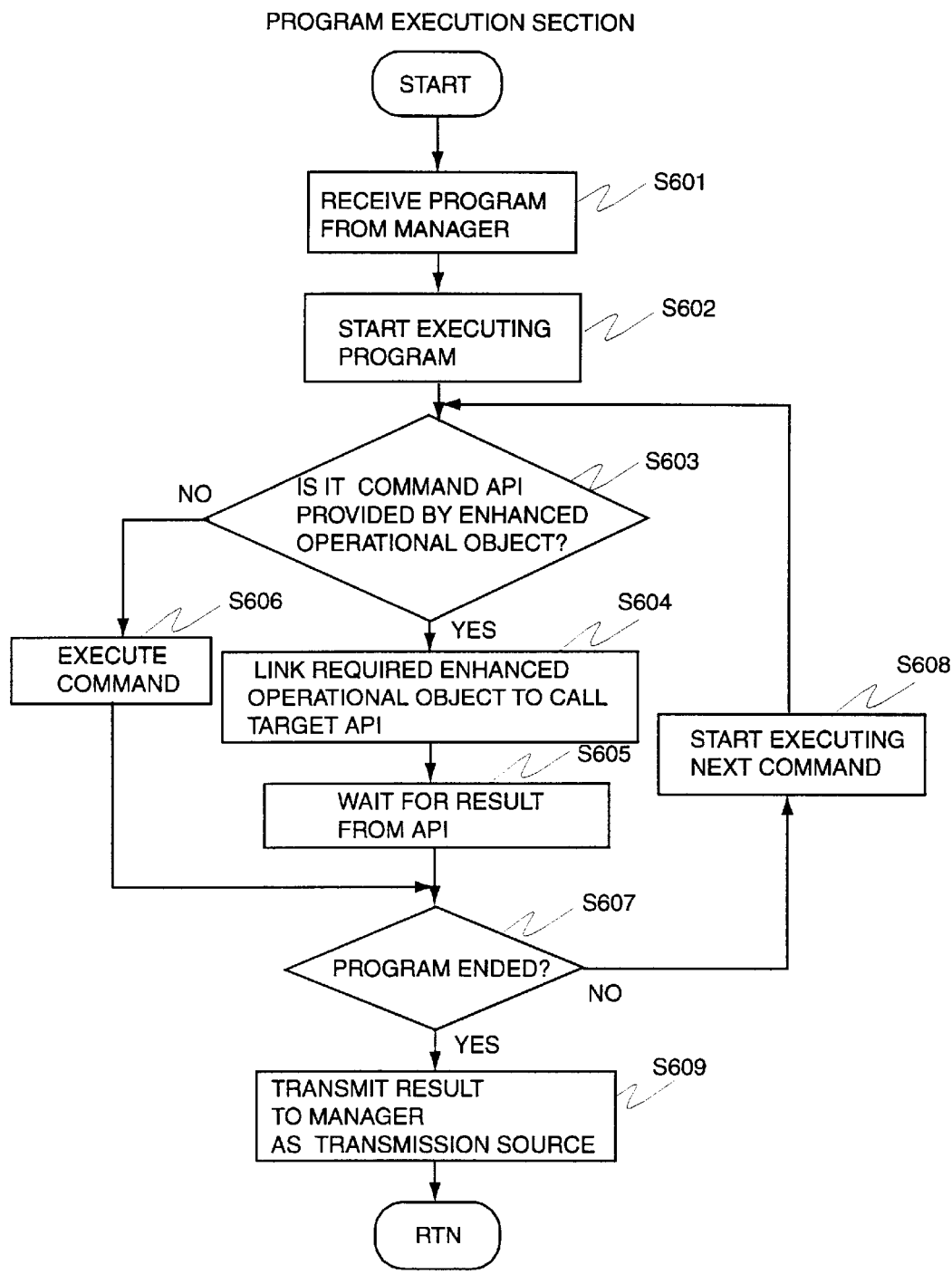
FIG. 6 is a flow chart illustrating the process flow of a program execution section of FIG. 5.

FIG. 5 is a block diagram illustrating the configuration of an agent device with program reception function (hereinafter merely referred to as an agent device) to which the agent device identification device 1 according to the first embodiment of the present invention is applied.

As shown in FIG. 5, the agent device identification device 501 of the present invention consists of an agent device 501, a program execution section 502, a remote function execution section 503, and a program execution information storage section 504, a management information storage section 505, and an agent device identification device 1.

The program execution section 502 has the function of receiving and executing the program P1 transmitted from the manager M1 or M2 or another agent device and the function of transmitting the execution result to the request source. FIG. 5 illustrates two managers M1 and M2 and one script P1. However, the system actually includes plural managers M1 to Mk and plural scripts P1 to Pm in execution (where k is an arbitrary positive integer and m is an arbitrary positive integer).

The program execution information storage section 504 has the function storing a model of a program transmitted to the enhanced operational object EO1 or EO2, the primitive operational objects PO1, PO2, or PO3, or another agent device, name conversion information used by the enhanced operational object EO1 or EO2, or the primitive operational object PO, PO2, or PO3, and network configuration information necessary for communications to another agent device. The name conversion information is a conversion table (hereinafter referred to as a name conversion table) for mutual conversion between an abstract name such as "node_A" or "pathA", easily understandable by a network manager, and Distinguished Name (hereinafter referred to as DN) or attribute label specifying a managed object written in the data type in an application language such as Java language or Tcl, and a conversion table (hereinafter referred to as a data conversion table) for mutual conversion between the data type in Abstract Syntax Notation One (hereinafter referred to as ASN.1) realized in C language or C++ and the data type in an application language. The network configuration information is formed of a table including the identifier of each path, the identifier of a device on the path, and the identifier of an agent device managing the device. FIG. 5 illustrates two enhanced operational objects EO1 and EO2 and three primitive operational objects PO1, PO2, and PO3. However, the system actually includes plural enhanced operational objects EO1 to EOs and plural primitive operational objects PO1 to POt (where s is an arbitrary positive integer and t is an arbitrary positive integer).

Each of the primitive operational objects PO1, PO2, and PO3 has the function of supplying the function of accessing managed object required from the enhanced operational objects EO1 and EO2 as application programming interface (hereinafter referred to as API) and the function of performing mutual conversion between the data type of ASN.1 realized in C language or C++ and the data type in an application language. This conversion is executed by using the data table stored in the program execution information storage section 504. The DN and attribute label of a managed object written in the data type of an application language is added to the argument of API supplied by the primitive operational object PO1, PO2, or PO3. The return value is the attribute information of a managed object written in the data type of an application language.

Each of the enhanced operational objects EO1 and EO2 realizes a sequence of management function which requires a complicated process such as path trace function or event management function, by using API supplied by the primitive operational objects PO, PO2, and PO3. Each enhanced operational object has the function of supplying the interface of the management function as API to a program, the function of converting an abstract name provided as an argument into the DN and attribute label of a managed object written in the type of an application language, and the function of processing the managed object from the primitive operational object PO1, PO2, or PO3 in the form requested by a program, and the function of communicating with another agent device. The enhanced operational objects EO1 and EO2 can use the functions supplied by plural primitive operational objects, for example, the primitive operational objects PO and PO2.

The management information storage section 505 stores the managed objects MO1, MO2, and MO3 in which actual managed resources are abstracted. FIG. 5 illustrates only three managed objects MO1, MO2, and MO3. However, the system actually includes plural managed objects MO1 to MOn (where n is an arbitrary positive integer).

The remote function execution section 503 has the function of operating an enhanced operational object, for example, enhanced operational object EO1, implementing a requested management function and the function of issuing a management function execution request to an agent device decided by the agent device identification device 1, when it receives the management function execution request from other agent devices A1 and A2.

Next, the operation of the agent device 1 with the above-mentioned configuration will be described below with reference to figures.

FIGS. 6 to 9 are flow charts each illustrating the process of the program execution section 502, the process of the enhanced operational objects EO1 and EO2, the process of the primitive operational objects PO1, PO2, and PO3, and the process of the remote function execution section 503, shown in FIG. 5.

It is now assumed that the program execution section 502 receives a program from, for example, the manager M1 (step S601).

Then the program execution section 502 begins executing the program (step S602). Successively, the program execution section 502 checks whether or not the command to be executed is the API sent from the enhanced operational object EO1 or EO2 (step S603).

Where the result in the step S603 indicates that the command is the API sent from the enhanced operational object EO1 or EO2, the requested API is called by linking the API to the enhanced operational object, for example, the enhanced operational object EO1 (step S604). At this time, the argument is designated with an abstract name such as "node_A". Thereafter, the result from the API is waited (step S605).

Figure 7:
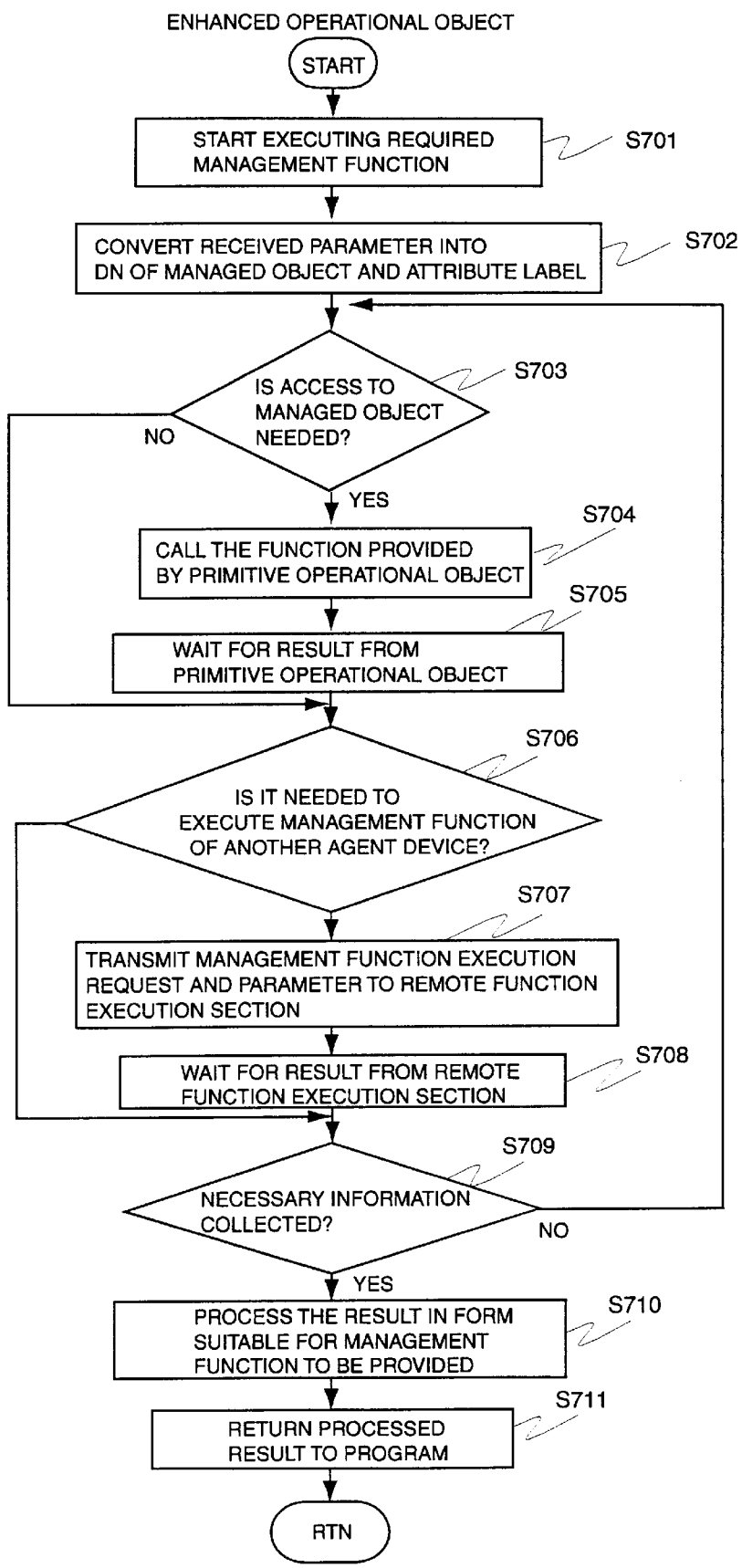
FIG. 7 is a flow chart illustrating the process flow of the enhanced operational object of FIG. 5.

Next, the enhanced operational object EO1 supplying the requested API begins the operation shown in FIG. 7.

Execution of a requested management function begins (step S701). Next, the enhanced operational object EO1 converts an input parameter described with an abstract name handed from the program P1 into DN of a managed object described with data type of an application language and its attribute label (step S702). The conversion operation is performed by using a name conversion table stored in the program execution information storage section 504. Then, the enhanced operational object EO1 checks whether or not access to the managed objects MO1, MO2, and MO3 are needed (step S703).

As the result of the step S703, if access to the managed objects MO1, MO2, and MO3 is needed, the enhanced operational object EO1 calls the access function to a primitive operational object, for example, a managed object supplied by the primitive operational object PO1 (step S704). At this time, the parameter handed to the primitive operational object PO1 corresponds to DN of a managed object converted in the step S702 and its attribute label. Then, the enhanced operational object EO1 waits for the result from the primitive operational object PO1 (step S705).

Figure 8:
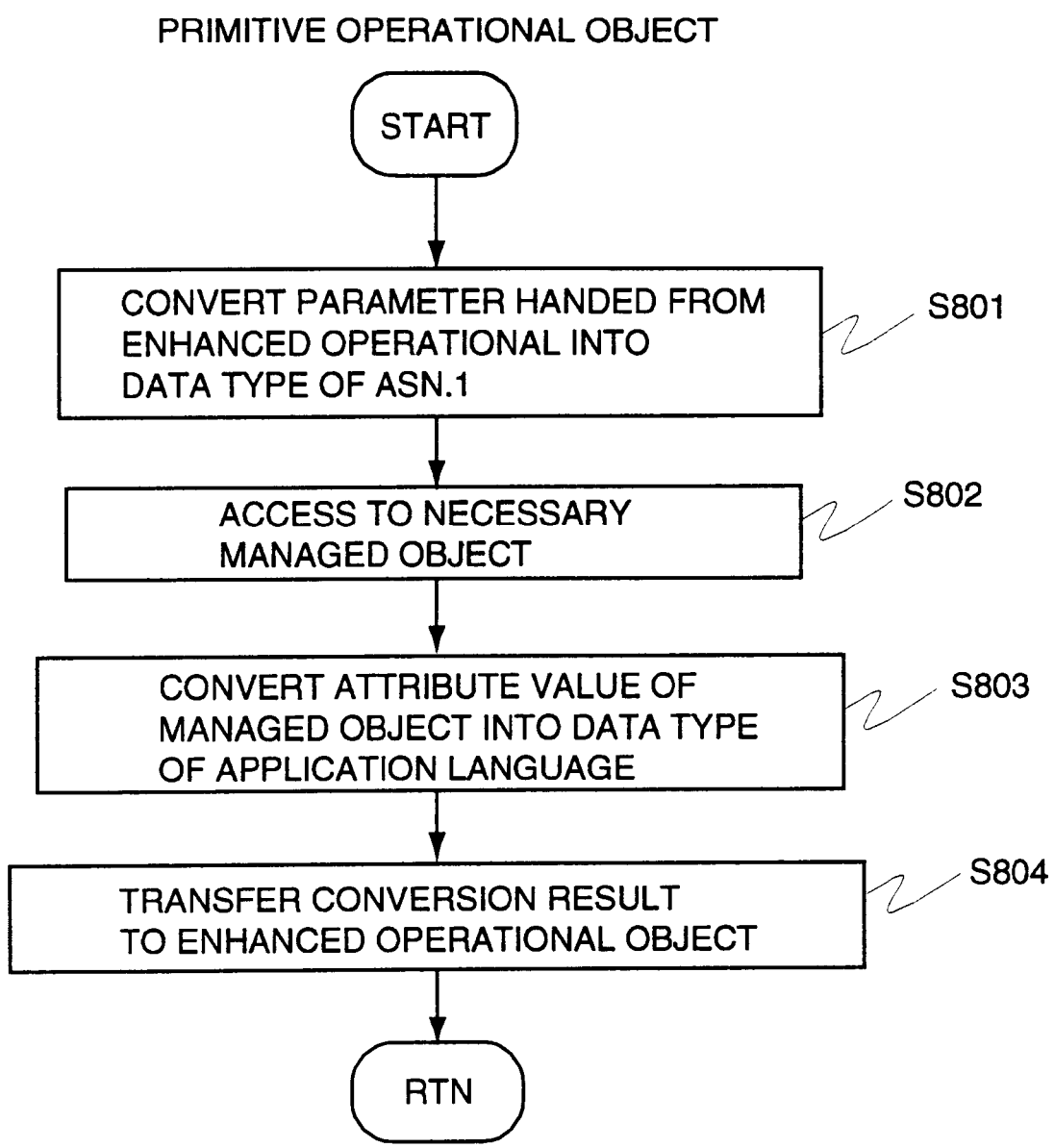
FIG. 8 is a flow chart illustrating the flow of a primitive operational object of FIG. 5.

Next, the primitive operational object PO1 begins to execute the process shown in FIG. 8.

First, execution of requested from enhanced operational object EO1 begins. Next, the DN and attribute label of a managed object written in the data type of an application language handed from the enhanced operational object EO1 are converted into the data type of ASN.1 realized in an actually accessible C language or C++ (step S801). This conversion is performed by suing the data conversion table stored in the program execution information storage section 504. Successively, a necessary managed object, for example, the managed object MO1 or MO2 is accessed based on the DN and attribute label of the converted managed object (step S802). Next, the data type of the managed object MO1 or MO2 written in the ASN.1 obtained in the step S802 is converted into a data type of an application language (step S803). The data conversion table stored in the program execution information storage section 504 is used for that conversion. Thereafter, the converted result is returned to the enhanced operational object EO1 (step S804).

The successive operation of the enhanced operational object EO1 is as follows:

When the result in the step S703 indicates that access to the managed objects MO1, MO2, and MO3 is not needed, or the result is captured from the primitive operational object PO1 in the step S705, the enhanced operational object EO1 checks whether or not it is needed to transmit a management function execution request to another agent device to execute an management function (step S706).

When the result in the step S706 exhibits that it is needed to transmit a management function execution request, the enhanced operational object EO1 transmits a management function execution request and parameters needed to identify the agent device which transmits the management function execution section to the remote function execution section 503 (step S707). Where the agent device 501 in an ATM network, for example, implements a path trace function, DN of vpTTPBidirectional managed object showing the termination of VP to be traced is listed as the parameter needed to identify the agent device A1. Thereafter, the enhanced operational object EO1 waits for the result from the remote function execution section 503 (step S708).

Figure 9:
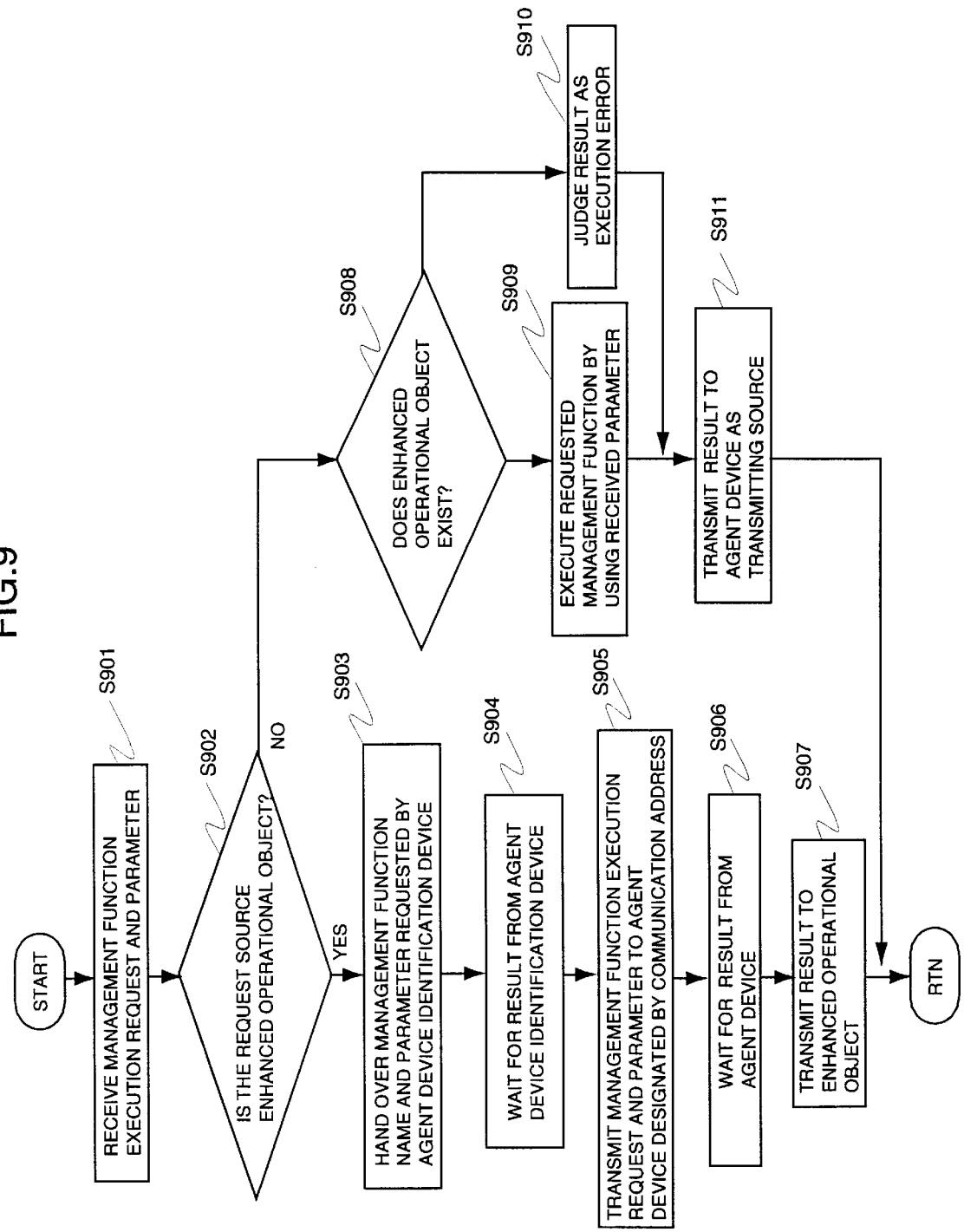
FIG. 9 is a flow chart illustrating the process flow of the remote function execution section of FIG. 5.

Next, the remote function execution section 503 begins to execute the operation shown in FIG. 9. The remote function execution section 503 receives the management function execution request and parameters from the enhanced operation objects EO1 and EO2 or other agent devices A1 and A2 (step S901).

Next, the remote function execution section 503 checks whether or not the transmission source of the management function execution request and parameters is the enhanced operational object EO1 or EO2 (step S902).

In the step S902, when the transmission source is an enhanced operational object, e.g. the enhanced operation object EO1, the remote function execution section 503 hands a requested management function name and a parameter from the enhanced operational object to the agent device identification device 1 to identify the agent device, e.g. the agent device A1 being the transmission source of the management function execution request (step S903). Thereafter, the remote function execution section 503 waits for the result from the agent device identification device (step S904).

Next, the agent device identification device 1 begins the operation shown in FIG. 2. However, this operation has already been described above. Hence the duplicate explanation will be omitted here. The communication route to the target agent device A1 is established based on the communication address of the agent device A1 captured in the step S904. The management function execution request as well as the parameter needed to execute the management function by the agent device A1 captured in the step S904 are transmitted to the agent device A1 (step S905). Thereafter, the result from the agent device A1 is waited (step S906). The result from the agent device A1 captured in the step S906 is returned to the enhanced operational object EO1 (step S907).

Where the result in the step S702 exhibits that the transmission source is not the enhanced operational object EO1 or EO2, the execution request transmission source is an agent device, e.g. the agent device A2. In this case, the operation of the remote function execution section 503 as described below.

Whether or not the enhanced operation implementing the management function required by the agent device A2 exists is checked (step S908).

If the result in the step S908 exhibits that the enhanced operation object implementing the required management function exists, the required control function is executed by using the parameter received in the step S901 (step S909).

If the result in the step S909 exhibits that the enhanced operation object implementing the management function does not exist, the result to be transmitted to the agent device A2 being a management function request source is judged as an error (step S910).

When the execution result of the management function required in the step S909 is obtained, or the result in the step S910 is an error, the captured result is transmitted to the agent device A2 being a transmission source (step S911).

The successive operation of the enhanced operational object EO1 is as follows:

When the result in the step S706 exhibits that executing the management functions of other agent devices A1 and A2 is not needed, or the result in the step S708 exhibits that the result of the management function executed by the agent device A1 is captured via the remote function executions section 503 in the step S708, it is checked whether or not all pieces of necessary control information have been prepared (step S709).

Where the result in the step S709 exhibits that all pieces of management information have been prepared, the management information collected in the form suitable to a management function to be supplied is processed (step S710). This process, for example, contains cumulative values such as statistical data or ratio calculation. Thereafter, the process result is returned to the program P1 which requires executing a management function provided by the enhanced operational object EO1 (step S911).

Next, the agent device 501 according to the second embodiment will be described in detail with reference to figures.

The agent device 501 according to the second embodiment is identical in configuration to the agent device 501 according to the first embodiment shown in FIG. 5.

The remote function execution section 503 has the function of transmitting and receiving an enhanced operational object between agent devices, in addition to the function of the remote function execution section 503 in the agent device 501 according to the first embodiment. The functions of other constituent elements are similar to those of other constituent elements forming the agent device 501 in the first embodiment.

Next, the operation of the agent device 501 according to the second embodiment will be described below with reference to figures.

Figure 10:
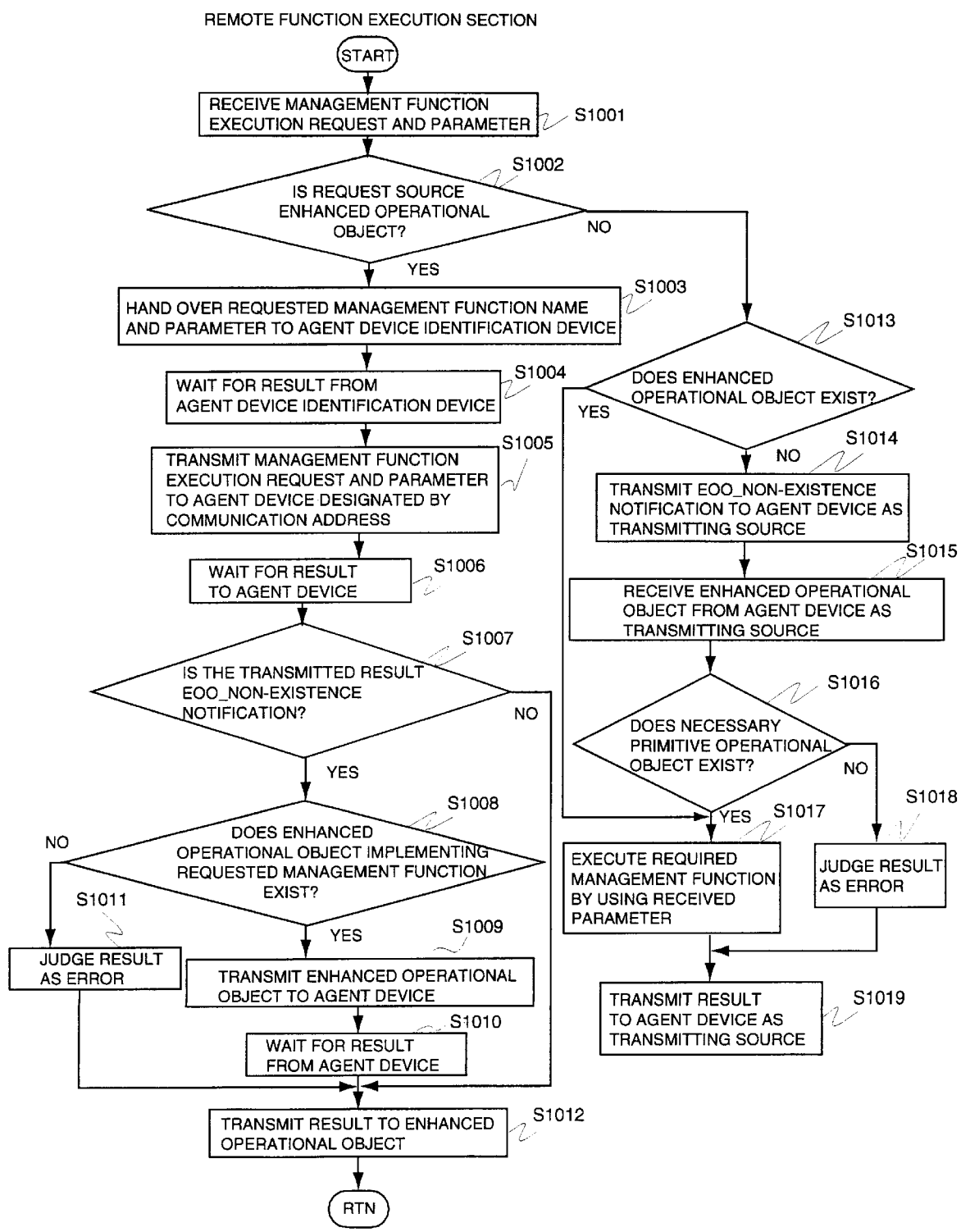
FIG. 10 is a flow chart illustrating the process flow of the remote function execution section in an agent device according to the second embodiment where the agent device identification device of the present invention is applied to an agent device with program reception function.

The agent device 501 according to the second embodiment differs from the agent device 501 according to the first embodiment in operation. The operation of the remote function execution section 503 in the agent device according to the first embodiment is shown in FIG. 9. However, the operation of the remote function execution section 503 in the agent device according to the second embodiment is shown in FIG. 10. Here, the operation of the remote function execution section 503 in the agent device 501 according to the second embodiment will be described below.

A management function request and a parameter output from the enhanced operation objects EO1 and EO2 or other agent devices A1 and A2 are received (step S1001). Next, the remote function execution section 503 checks whether or not the transmission source of the management function execution request and the parameter are enhanced operation objects EO1 and EO2 (step S1002).

When the result in the step S802 exhibits that the transmission source is an enhanced operational object, e.g. enhanced operational object EO1, the management function name and the parameter required by the agent device identification device 1 are handed to identify an agent device, e.g. the agent device A1, being a source of transmitting a management function execution request (step S1003). Thereafter, the result from the agent device identification device 1 is waited (step S1004).

Next, the agent device identification device 1 begins the operation shown in FIG. 2. However, because this operation is similar to the above-mentioned operation, the duplicate description will be omitted here.

The successive operation of the remote execution section 503 is as follows:

The communication path to a target agent device A1 is established based on the communication address of the agent device A1 captured in the step S1004. A management function execution request as well as a parameter needed where a management function is executed in the agent device A1 captured in the step S1004 are transmitted to the agent device A1 (step S1005). Thereafter, the result from the agent device A1 is waited (step S1006).

It is checked whether or not the result transmitted from the agent device A1 obtained in the step S1006 is "EOO_non-existence notification" representing that the enhanced operational object implementing a requested management function does not exist in the agent device A1 (step S1007).

Where the result in the step S1007 exhibits that the received result is EOO_non-existence notification, it is checked whether or not the enhanced operational object implementing a requested control function exists in the self agent device 501 (step S1008).

Where the result in the step S1008 exhibits that the enhanced operational object implementing a management function executed in the agent device A1 does not exist, it is judged that the execution result of the management function is erroneous (step A1011).

Where the result in the step S1008 exhibits that the enhanced operational object implementing a management function executed in the agent device A1 exists, the enhanced operational object is transmitted to the agent device A1 (step S1009).

Successively, the execution result from the agent device A1 executing the management function is waited (step S1010).

Where the result in the step S1007 exhibits that the transmitted result is not EOO_non-existence notification, or that the result from the agent device A1 is captured in the step S1010, the execution result is transmitted to the enhanced operational object EO1 (step S1012).

Where the result in the step S1002 exhibits that the request source is not the enhanced operational object EO1, a management function operation request from another agent device, e.g. the agent device A1 is received. Hence, it is checked whether or not the enhanced operational object implementing the requested management function exists (step S1013).

Where the result in the step S1013 exhibits that the enhanced operational object implementing the requested management function does not exist, EOO_non-existence notification is transmitted to the agent device A1 being a request source (step S1014). Thereafter, the enhanced operational object transmitted from the agent device A1 is waited (step S1015). Successively, it is checked whether or not the primitive operational object needed to operate the enhanced operational object received in the step S1015 exists (step S1016).

Where the result in the step S1016 exhibits that a necessary primitive operational object does not exist, the enhanced operational object cannot execute the requested management function, so that the execution result is judged as an error (step S1018).

Where the result in the step S1016 exhibits that the necessary primitive operational object does not exist, or that the result in the steps S1013 exhibits that the enhanced operational object implementing the requested management function exists, the requested control function is executed by using the parameter received in the step S1001 (step S1017).

The execution result of the management function captured in the step S1017 or the execution result captured in the step S1018 is transmitted to the agent device A1 being a transmission source (step S1019).

Next, the agent device 1 according to the third embodiment will be described below by referring to figures.

Figure 11:
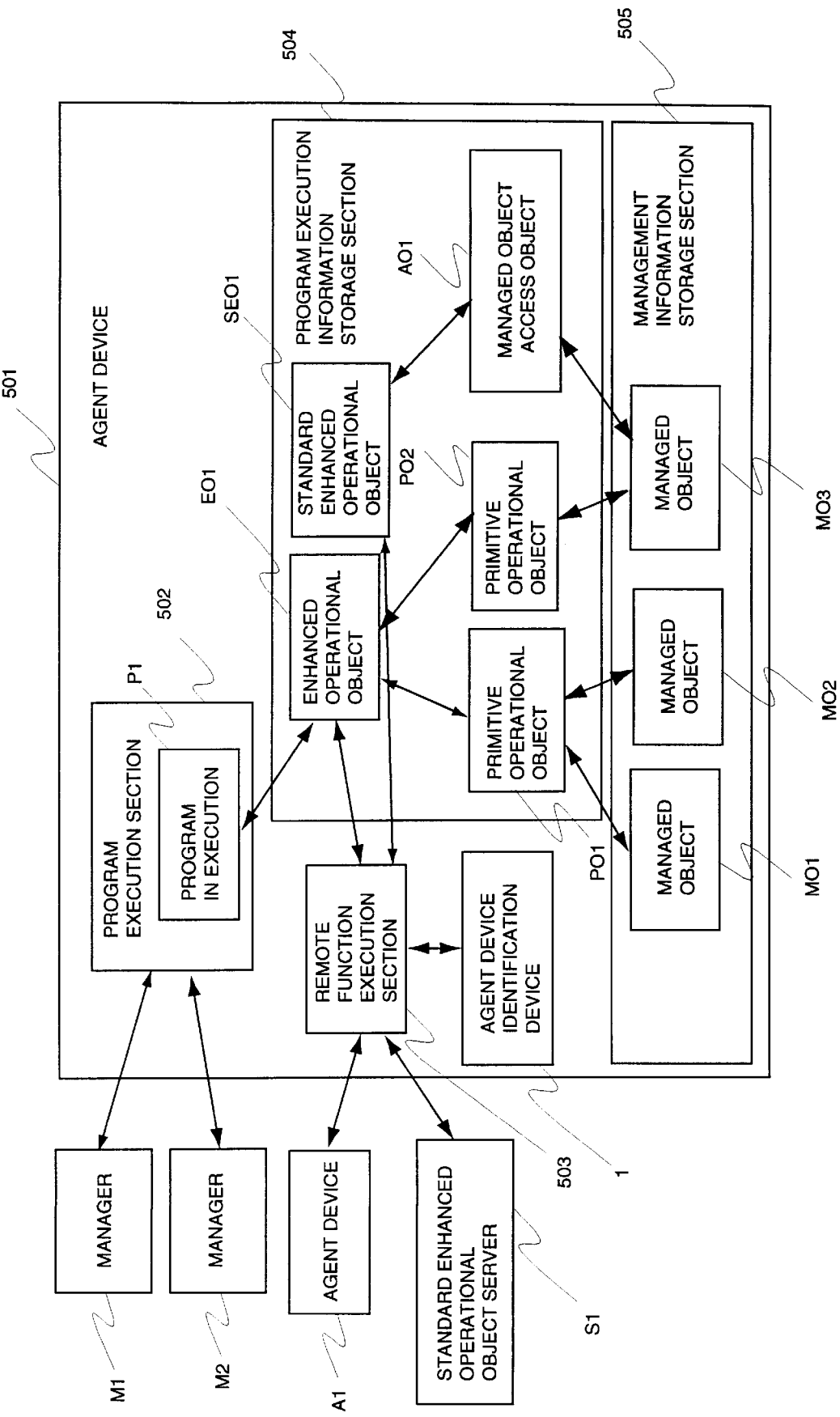
FIG. 11 is a block diagram illustrating the configuration of an agent device according to the third embodiment where the agent device identification device is applied to an agent device with program reception function.

FIG. 11 is a block diagram illustrating the configuration of the agent device 501 according to the third embodiment. Unlike the first embodiment shown in FIG. 5, the agent device 501 of the third embodiment is characterized in that the standard enhanced operational object and the managed object access object AO1 are added.

By using an access function to the managed objects MO1, MO2, and MO3 possessed by the managed object access object AO1, not an access function to the primitive managed operational objects MO1, MO2, and MO3 processed by the primitive managed operational objects PO1 and PO2, the standard enhanced operational object SEO1 has the function of supplying one management function which needs a complicated process such as path trace function or event control function, the function of converting an abstract name provided as an input parameter when a control function is executed, into DN and attribute label of a managed object described in the form of the data type in an application language, and the function of processing the attribute value of a managed object from the managed object access object AO1 into the form suitable for a provided management function. The standard enhanced operational object SEO1 is stored in the standard enhanced operational object server S1. The standard enhanced operational object, if necessary, is accessed by the agent device and then transferred. FIG. 11 shows only one standard enhanced operational object SEO1. However, plural standard enhanced operational objects SEO1 to SEOv (v is an arbitrary positive integer) are actually used.

Moreover, the managed object access object AO1 has a function of accessing one managed object, for example, the managed object MO3. The access function is based on the management procedure of a common management information protocol (hereinafter referred to as CMIP) being a standard management protocol and a simple network management protocol (hereinafter referred to as SNMP). The access function includes capture and variation of the attribute value of a managed object, creation and deletion of managed object, and the like.

The remote function execution section 503 has the function of communicating with the standard enhanced operational object server S1 storing plural standard enhanced operational objects to capture the standard enhanced operational object EO1, in addition to the function of the remote function execution section 503 in the agent device 501 according to the first embodiment. The standard enhanced operational object server S1 is a server that stores a standard enhanced operational object and is accessible from all agent devices.

The operations of other constituent elements are identical to those of the equivalents in the agent device 501 according to the first to second embodiments.

Next, the operation of the agent device 501 with above-mentioned configuration according to the third embodiment will be described below with reference to the drawings.

Figure 12:
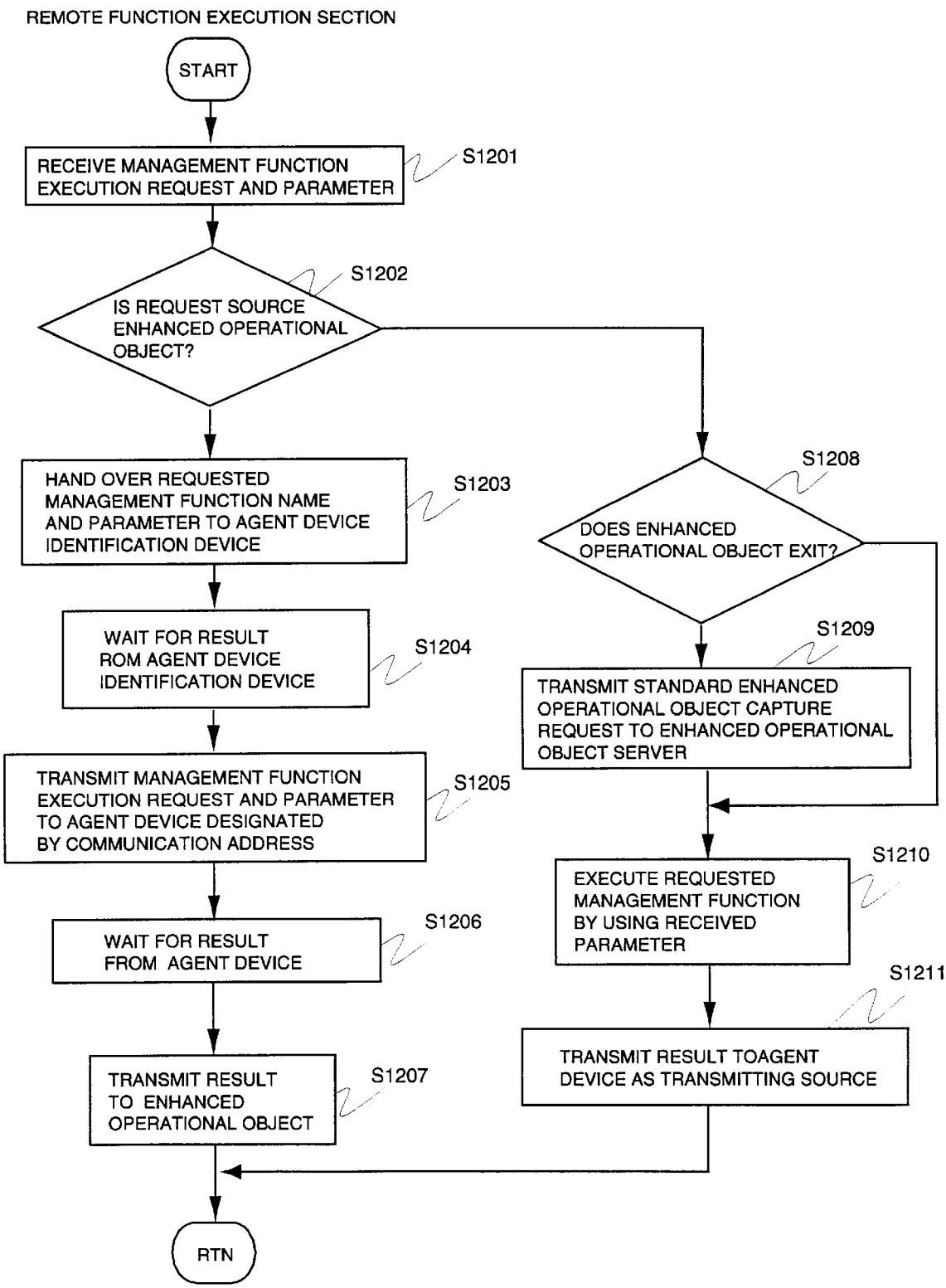
FIG. 12 is a flow chart illustrating the process flow of the remote function execution section of FIG. 11.
Figure 13:
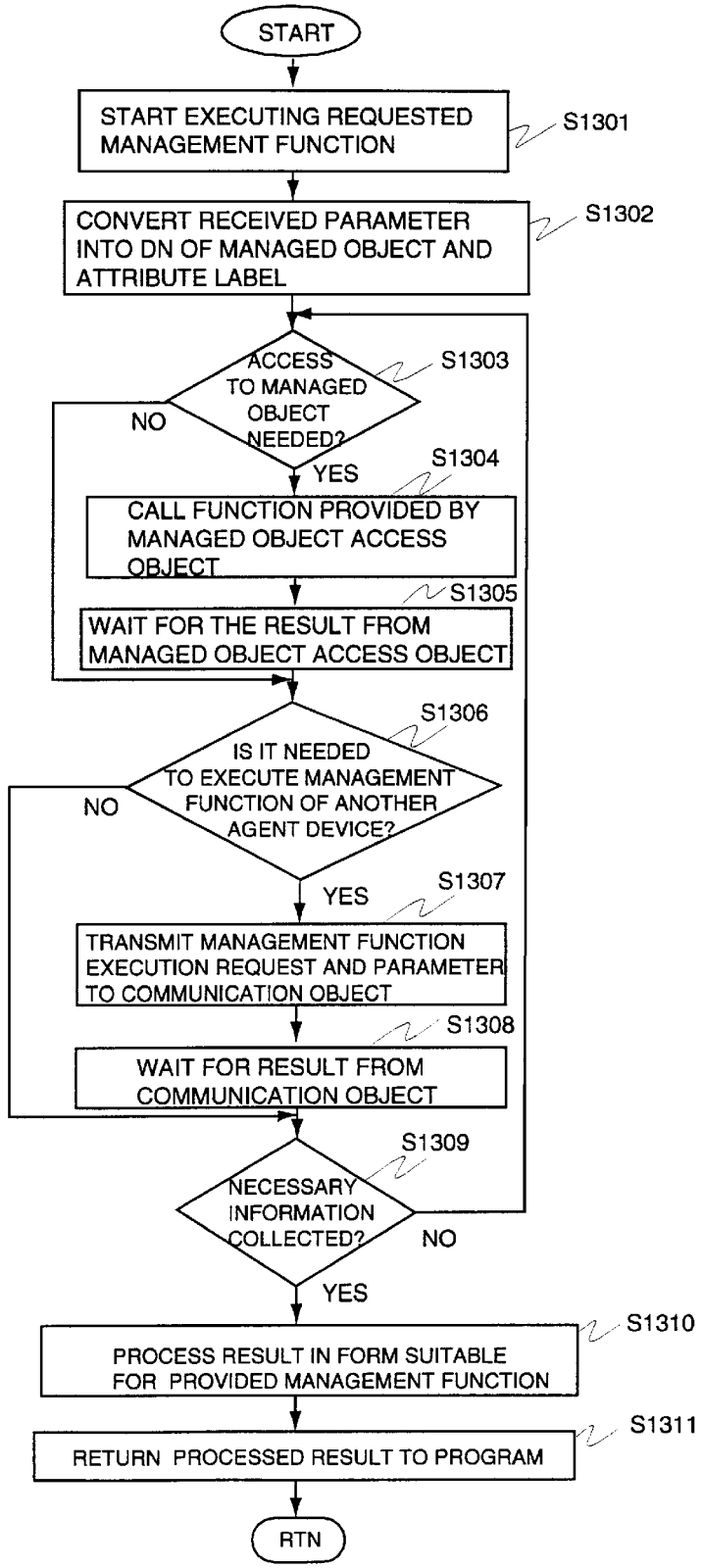
FIG. 13 is a flow chart illustrating the process flow of the standard enhanced operational object of FIG. 11.
Figure 14:
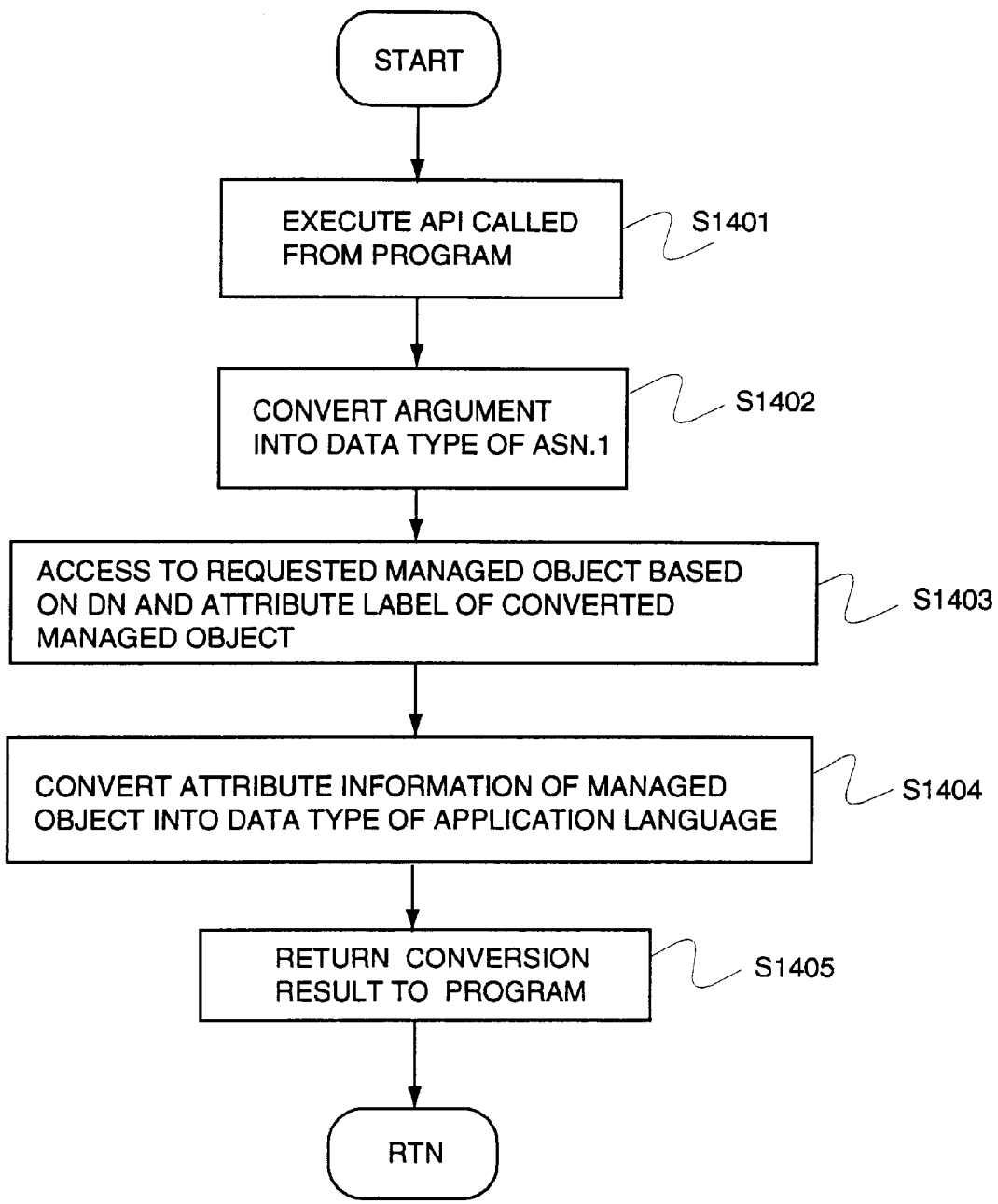
FIG. 14 is a flow chart illustrating the process flow of the managed object access object of FIG. 11.

The agent device 501 according to the third embodiment differs from the agent device 501 according to the second embodiment in operation. The operation of the remote function execution section 503 in the agent device 501 according to the first embodiment is shown in FIG. 10. However, the operation of the remote function execution section 503 of in the third embodiment is shown in FIG. 12. Consequently, the operation of the standard enhanced operational object SEO1 and the operation of the managed object access object AO1 are added as shown in FIGS. 13 and 14. For that reason, the operation of the remote function execution section 503 will be described by referring to FIG. 12.

A management function execution request and parameters are received from the enhanced operational object EO1 or another agent device A1 (step S1201). Next, it is checked whether or not the transmission source of the management function execution request and the parameters is the enhanced operational object EO1 (step S1202).

Where the result in the step S1202 exhibits that the transmission source is an enhanced operational object, for example, the enhanced operational object EO1, the management function name and parameters required by the agent device identification device are handed to identify the agent device, for example, the agent device A1 being the management function execution request transmission source (step S1203). Thereafter, the remote function execution section 503 waits for the result from the agent device identification device 1 (step S1204).

Next, the agent device identification device 1 begins the operation shown in FIG. 2. The operation has been already described and hence the duplicate description will be omitted here.

The successive operation of the remote function execution section 503 is as follows:

The communication path to a target agent device A1 is established based on the communication address of the agent device A1 captured in the step S1204. The management function execution require as well as the parameter needed when the agent device A1 captured in the step S1204 executes a management function are transmitted to the agent device A1 (step S1205). Thereafter, the remote function execution section 503 waits for the result from the agent device A1 (step S1206). The result transmitted from the agent device A1 obtained in the step S1206 is transmitted to the enhanced operation object EO1 being a transmission source (step S1207).

Where the result in the step S1202 exhibits that a request source is not the enhanced operational object EO1, a management function execution request is received from another agent device, for example, agent device A1. Hence, the remote function execution section 503 checks whether or not the enhanced operational object implementing a requested management function exists (step S1208).

Where the result in the step S1208 exhibits that the enhanced operational object implementing a requested management function exists, the standard enhanced operational object SEO1 implementing a requested management function is captured. Hence, the standard enhanced operational object capture request is transmitted to the standard enhanced operational object server S1 (step S1209).

Where a standard enhanced operational object SEO1 implementing a management function requested in the step S1209 is captured, or the result in the step S1208 exhibits that an enhanced operational object implementing a management function required by the self agent device 501, a requested management function is executed by using the parameter received in the step S1201 (step S1210).

Where a management function is executed by using the enhanced operational object in the step S1210, the standard enhanced operational object begins to execute the operation shown in FIG. 7.

Where a management function is executed by the standard enhanced operational object SEO1, the standard enhanced operational object SEO1 begins the operation shown in FIG. 13.

The operation of the enhanced operational object EO1 shown in FIG. 7 has been already described. Hence, the operation of the standard enhanced operational object SEO1 will be described below with reference to FIG. 13.

First, the execution of the requested management function begins (step S1301). Next, the parameter described with the abstract name handed from the remote function execution section 503 is converted into the DN and attribute label of a managed object written in the data type of an application language (step S1302). This conversion is performed by using the name conversion table stored in the program execution information storage section 504. Thereafter, whether or not access to the managed object is needed is checked (step S1303).

Where the result in the step S1303 exhibits that access to the managed objects MO1, MO2, and MO3 is needed, access function to a managed object supplied from the managed object access object AO1 is called (step S1304).

Thereafter, the result from the managed object access object AO1 is waited (step S1305).

Next, the managed object access object AO1 supplying a required API begins the operation shown in FIG. 14.

First, the execution of the required API begins (step S1401). Next, the DN and attribute label of a managed object handed as an argument is converted into the data type of C language or C++ which is accessible actually (step S1402). This conversion is performed by using the data conversion table stored in the program execution information storage section 504. Successively, a managed object, e.g. the managed object MO1, required based on the DN and attribute label of the managed object converted in the step S1402 is accessed (step S1403). Thereafter, the attribute information of a managed object described in the data type of ASN.1 obtained in the step S1403 is converted into the data type of an application language (step S1404). This conversion is performed by using the data conversion table used in the step S1402. Then, the attribute information of the converted managed object is returned to the standard enhanced operational object SEO1 (step S1405).

The successive operation of the enhanced operational object EO1 is as follows:

Where the result in the step S1303 exhibits that access to the managed object is not needed, or that the result in the step S1305 exhibits that the result returns from the managed object access object, the enhanced operational object EO1 checks whether or not there is a task to be required to another agent device (step S1306).

Where the result in the step S1306 exhibits that a task to be required exists, a management function execution request and parameters are transmitted to another agent device (step S1307). Thus, the result is waited (step S1308).

Where the result in the step S1306 exhibits that a task to be required to another agent device does not exist, or the result in the step S1308 exhibits that the execution of the program is obtained from the agent device, whether or not all pieces of necessary information have been prepared is checked (step S1309).

Where the result in the step S1309 exhibits that all pieces of necessary management information have been prepared, the result is processed in the form suitable to the management function (step S1310). Thereafter, the process result is returned to the program (step S1311).

Next, the configuration of the agent device 501 according to the fourth embodiment will be described below in detail by referring to the drawings.

Figure 15:
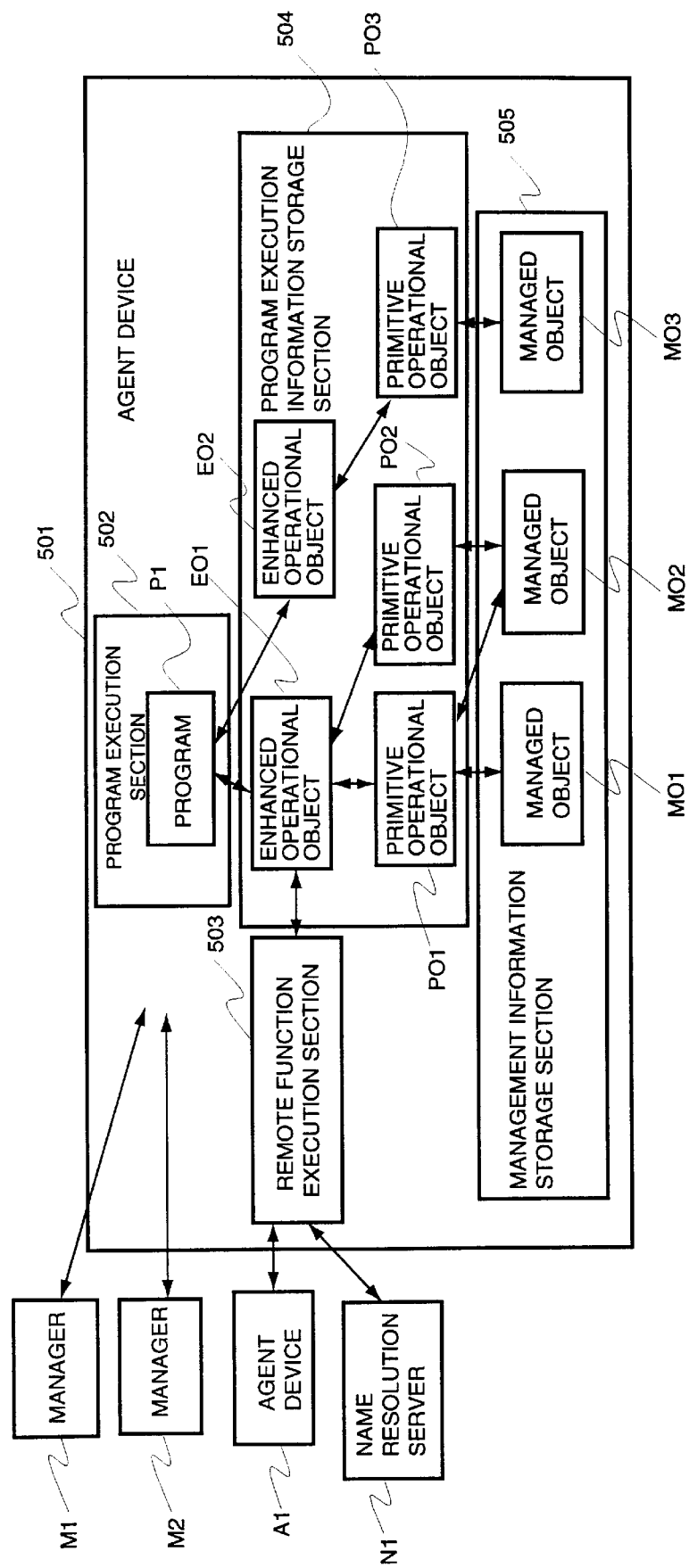
FIG. 15 is a block diagram illustrating the configuration of an agent device according to the fourth embodiment where the agent device identification device is applied to an agent device with program reception function.

FIG. 15 is a block diagram illustrating the configuration of the agent device 501 according to the fourth embodiment.

The configuration of the agent device 1 is identical to that of the agent device 1 related to the first to third embodiments. However, the name resolution server N1 has the function of identifying the agent device issuing a management function execution request, supplied by the remote function execution section 3 in the agent device 1 related to the first to third embodiments, and the function of storing network information needed for the identification process, retrieval rules, and DN-communciation address conversion information. Moreover, the remote function execution section 3 has the communication function to the name resolution server N1.

That is, the configuration of the agent device 501 is characterized in that the agent device identification device in the agent device 501 according to the first to third embodiments is separated as the name resolution server N1.

Next, the operation of the agent device 1 according to the fourth embodiment will be described below. The agent device 501 differs from the agent device 501 of the first to third embodiments in that communications between the remote function execution section 503 and the name resolution server (agent device identification device 1) N1 are established via the network. That is, the remote function execution section 3 operates as shown in FIGS. 9 to 16. The operation of the name resolution server N1 is added as shown in FIG. 17.

Figure 16:
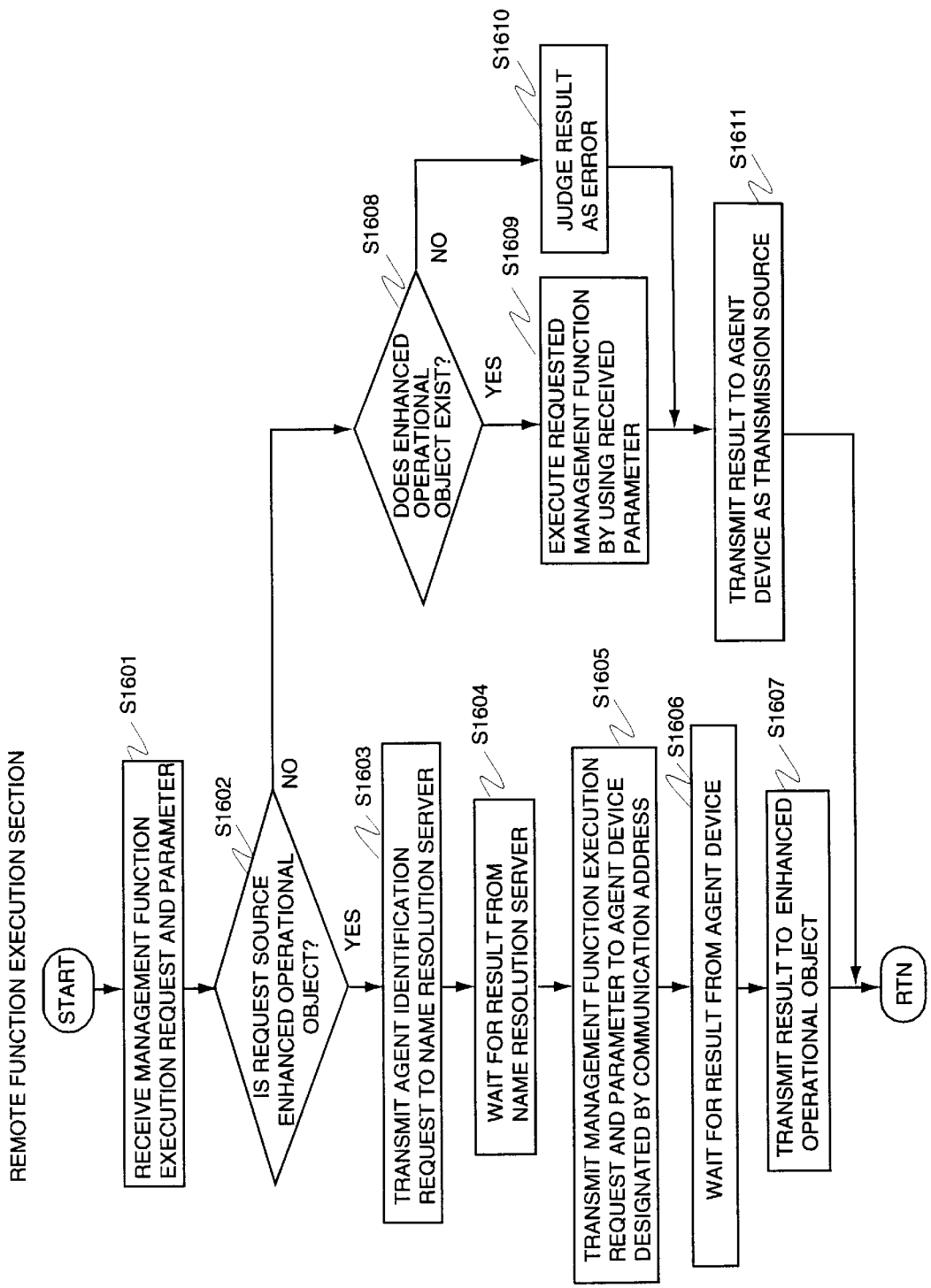
FIG. 16 is a flow chart illustrating the process flow of the remote function execution section of FIG. 15.
Figure 17:
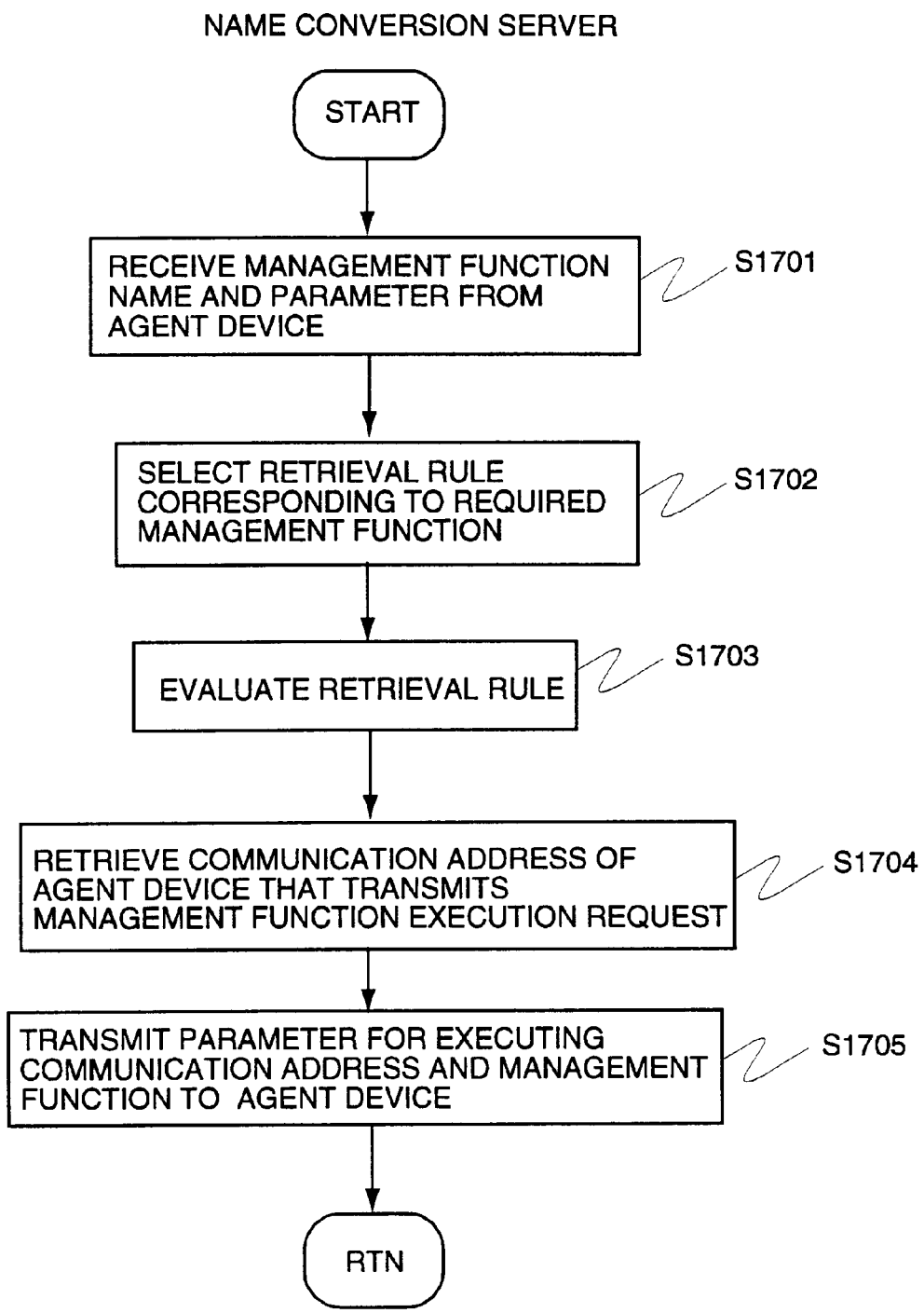
FIG. 17 is a flow chart illustrating the process flow of the name resolution server of FIG. 15.
Figure 18:
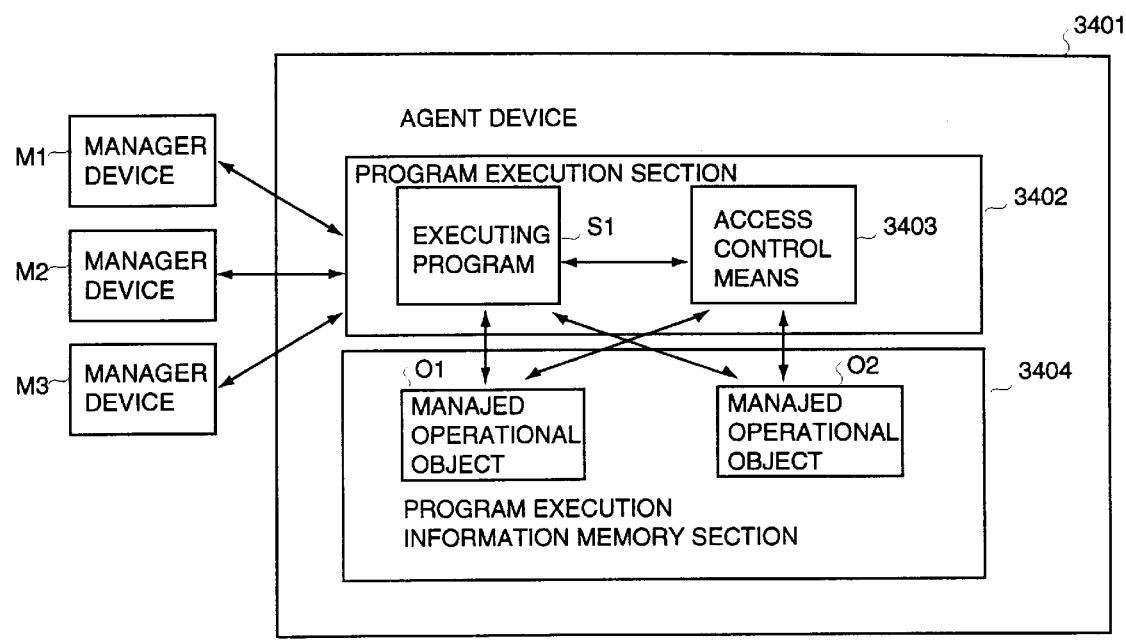
FIG. 18 is an example of a conventional agent device.
Figure 19:
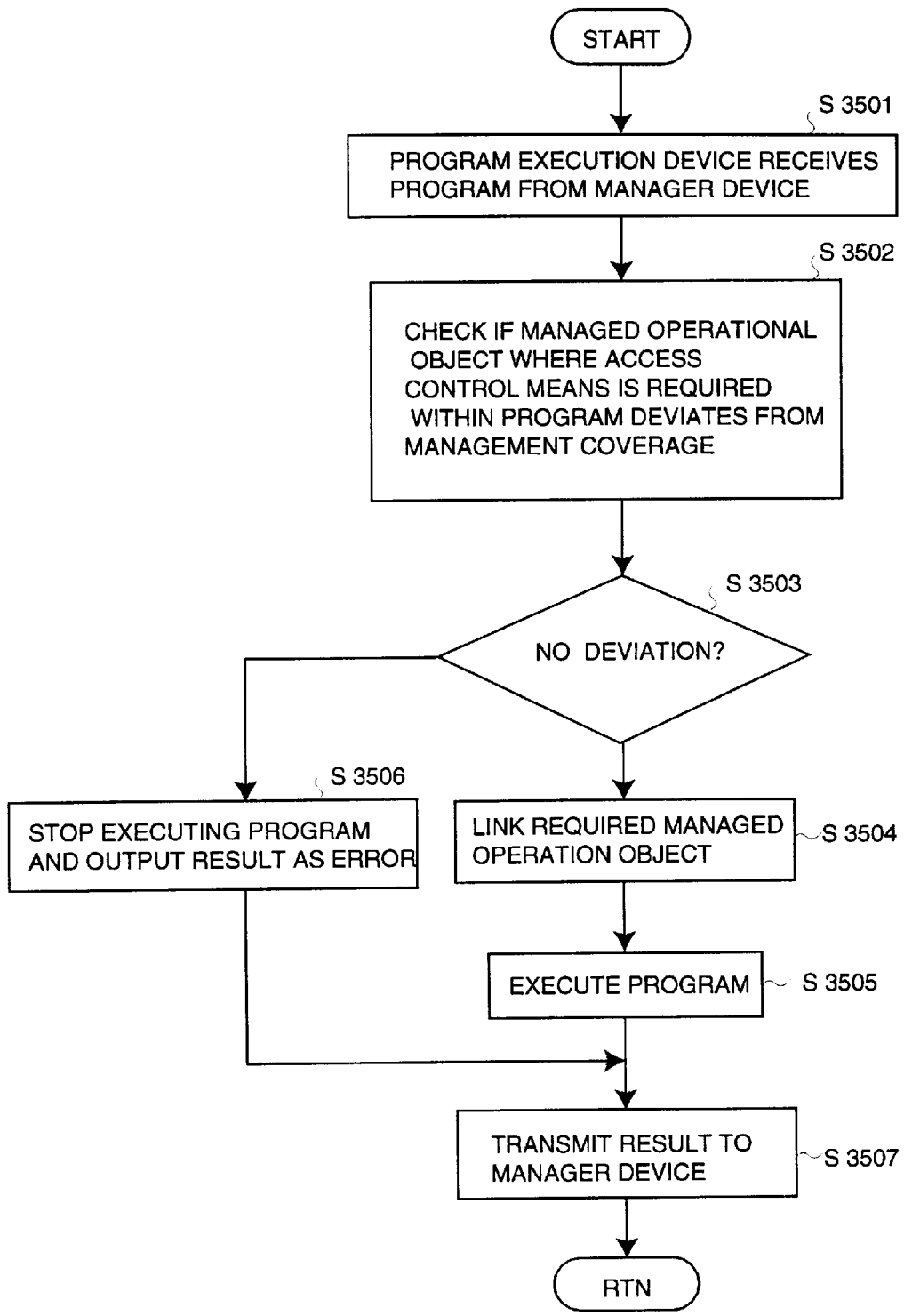
FIG. 19 is a flow chart illustrating the operation of the conventional agent.

Moreover, the operation of the remote function execution section 3 in the agent device 1 according to the first embodiment, shown in FIG. 9, differs from the operation of the remote function execution section 3 in the agent device 1 according to the fourth embodiment, shown in FIG. 16, in that the steps S903 to S905 to identify another agent device in FIG. 9 corresponds to the step S1603 to transmit an agent identification request to the name conversion server N1 in FIG. 16. Here, the operation of the name conversion server N1 activated by the remote function execution section 3 will be described below with reference the figures.

The name conversion server N1 receives parameters needed to identify the management function name and an agent device in execution from the agent device 1 (step S1701). Next, a retrieval rule is selected based on the management function name received in the step S1701 (step S1702). The retrieval rule is evaluated by using the parameter received in the step S1701 and network information held in the name conversion server N1 (step S1703). The agent device 1 retrieves the communication address of an agent device which next transmits a management function execution request by using the identification DN obtained in the step S1703 and the DN-cmmunication address conversion information (step S1704). The retrieval result is transmitted to the agent device 1 (step S1705).

As described above, the embodiments of the present invention uses the scheme in which the identification DN being a key of identifying an agent device is derived by using the relation between managed objects used by a management function every time an agent device is identified and then obtaining the communication address of an agent device based on the identification DN. Hence, the agent device which can flexibly deal with a dynamic variation in network condition such as configuration variation can be effectively identified.

Since the agent device identification device identifies an agent device for communications by evaluating a retrieval rule according to each management function, an agent device can be systematically and effectively identified based on all the management functions.

Moreover, in the agent device identification device according to the first embodiment, the memory occupation in a program execution time can be effectively reduced by deriving inter-agent device communication function from each enhanced operational object to use the function provided by another agent device and sharing the communication function between enhanced operational objects.

Furthermore, in the agent device identification device according to the second embodiment, the remote function execution section in the agent device according to the first embodiment has the function of transmitting and receiving an enhanced operational object implementing a requested management function between agent devices. Thus, even when the enhanced operational object implementing a requested management function does not exist, the enhanced operational object can be dynamically captured to execute the required management function. Consequently, the second embodiment has the effect of dynamically expanding the management function of the agent device.

In the agent device identification device according to the third embodiment, the remote function execution section in the agent device according to the second embodiment can communicate with the standard enhanced operational object server, thus dynamically capturing the standard enhanced operational object. As a result, since it is not needed that all agent devices hold the same standard enhanced operational object, the resources of each agent device can be effectively saved.

In the agent device according to the fourth embodiment, since the agent device identification device acting as a name resolution server in the agent device identification device according to the first to third embodiments is accessible from all agent devices, it is not required that all agent devices have the same agent device identification device. Hence, the fourth embodiment has the effect of saving resources of each agent device.

The entire disclosure of Japanese Patent Application NO. 9-214355 filed on Aug. 8, 1997 including specification, claims, drawing and summary are incorporated herein by reference in its entirety.

What is claimed is:

1. A network system comprising:
   a name resolution server for identifying another agent device which transmits a management function execution request when it is needed that an enhanced operational object transmits said management function execution request to said another agent device;
   a program execution information storage section for storing an enhanced operational object which realizes management functions in a network management to provide said management functions to a program, a primitive operational object which provides a function of accessing a managed object, to said enhanced operational object, a managed object access object having a function of directly accessing one management function, and a standard enhanced operational object of providing a management function by using a function possessed by said managed object access object;
   a program execution section having means of executing a program transmitted from a manager, means of linking an enhanced operational object required by said program during a program execution to said program, and means of transmitting an execution result of said program to said manager;
   a management information storage section for storing said managed object;
   an agent identification device for identifying another agent device transmitting an execution request of said management function when said enhanced operational object needs to transmit a management function execution request to said agent device; and
   a remote function execution section having means of issuing a management function execution request to another agent device decided by said agent identification device, means of executing a required enhanced operational object when another agent device requires executing a management function, means of communicating with said standard enhanced operational object server which stores said standard enhanced operational object and then dynamically capturing said standard enhanced operational object, and means of establishing communications via said name resolution server and a network.

2. The network system of claim 1, wherein said name resolution server comprises:
   retrieval rule evaluation means for storing a retrieval rule for identifying an agent device and network information for evaluating said retrieval rule, identifying an agent device to which a program is transmitted using said retrieval rule and, if necessary, said network information, and outputting the identifier of an identified agent device; and
   communication address retrieval means for storing conversion information in which the correspondence between said identifier and a communication address is described, and deriving the communication address of an agent device to which a program is next transmitted, using said identifier and said conversion information input from said retrieval rule evaluation section.

3. The network system of claim 2, wherein said network information includes network configuration information being physical location information between transmitters, an inclusion relation of a managed object, and pointer information indicating other managed object held by a managed object.

4. The network system of claim 2, wherein said retrieval rule is a program for outputting a distinguished name for identifying an agent device which next transmits a management function execution request and a parameter needed when a target agent device executes a required management function, based on a relation between managed objects used in a management function.

5. A network system comprising:
   a name resolution server for identifying another agent device which transmits a management function execution request when it is needed that an enhanced operational object transmits said management function execution request to said another agent device;
   a program execution information storage section for storing an enhanced operational object which realizes management functions in a network management to provide said management functions to a program and a primitive operational object which provides a function of accessing a managed object, to said enhanced operational object;
   a program execution section having means of executing a program transmitted from a manager, means of linking an enhanced operational object required by said program during a program execution to said program, and means of transmitting an execution result of said program to said manager;
   a management information storage section for storing said managed object;
   an agent identification device for identifying another agent device transmitting an execution request of said management function when said enhanced operational object needs to transmit a management function execution request to said agent device; and
   a remote function execution section having means of issuing a management function execution request to another agent device decided by said agent identification device, means of executing a required enhanced operational object when another agent device requires executing a management function, and means of establishing communications via said name resolution server and a network.

6. The network system of claim 5, wherein said name resolution server comprises:

retrieval rule evaluation means for storing a retrieval rule for identifying an agent device and network information for evaluating said retrieval rule, identifying an agent device to which a program is transmitted using said retrieval rule and, if necessary, said network information, and outputting the identifier of an identified agent device; and communication address retrieval means for storing conversion information in which the correspondence between said identifier and a communication address is described, and deriving the communication address of an agent device to which a program is next transmitted, using said identifier and said conversion information input from said retrieval rule evaluation section.

7. The network system of claim 6, wherein said network information includes network configuration information being physical location information between transmitters, an inclusion relation of a managed object, and pointer information indicating other managed object held by a managed object.

8. The network system of claim 6, wherein said retrieval rule is a program for outputting a distinguished name for identifying an agent device which next transmits a management function execution request and a parameter needed when a target agent device executes a required management function, based on a relation between managed objects used in a management function.

9. An agent device with program reception function, comprising:

a program execution information storage section for storing an enhanced operational object which realizes management functions in a network management to provide said management functions to a program, a primitive operational object which provides a function of accessing a managed object, to said enhanced operational object, a managed object access object having a function of directly accessing one managed object, and a standard enhanced operational object of providing a management function using a function possessed by said managed object access object;

a program execution section having means of executing a program transmitted from a manager, means of linking an enhanced operational object required by said program during a program execution to said program, and means of transmitting an execution result of said program to said manager;

a management information storage section for storing said managed object;

an agent identification device for identifying another agent device transmitting an execution request of said management function when said enhanced operational object needs to transmit a management function execution request to said agent device; and a remote function execution section having means of issuing a management function execution request to another agent device decided by said agent identification device, means of executing a required enhanced operational object when another agent device requires executing a management function, and means of communicating with a standard enhanced operational object server which stores said standard enhanced operational object and then dynamically capturing said standard enhanced operational object.

10. The agent device with program reception function of claim 9, wherein said agent identification device comprises:

retrieval rule evaluation means for storing a retrieval rule for identifying an agent device and network information for evaluating said retrieval rule, identifying an agent device to which a program is transmitted using said retrieval rule and, if necessary, said network information, and outputting the identifier of an identified agent device; and communication address retrieval means for storing conversion information in which the correspondence between said identifier and a communication address is described, and deriving the communication address of an agent device to which a program is next transmitted, using said identifier and said conversion information input from said retrieval rule evaluation section.

11. The agent device identification device with program reception function of claim 10, wherein said network information includes network configuration information being physical location information between transmitters, an inclusion relation of a managed object, and pointer information indicating other managed object held by a managed object.

12. The agent device identification device of claim 10, wherein said retrieval rule is a program for outputting a distinguished name for identifying an agent device which next transmits a management function execution request and a parameter needed when a target agent device executes a required management function, based on a relation between managed objects used in a management function.

13. An agent device with program reception function, comprising:

a program execution information storage section for storing an enhanced operational object which realizes management functions in a network management to provide said management functions to a program and a primitive operational object which provides a function of accessing a managed object, to said enhanced operational object;

a program execution section having means of executing a program transmitted from a manager, means of linking an enhanced operational object required by said program during a program execution to said program, and means of transmitting an execution result of said program to said manager;

a management information storage section for storing said managed object;

an agent identification device for identifying another agent device transmitting an execution request of said management function when said enhanced operational object needs to transmit a management function execution request to said agent device; and a remote function execution section having means of issuing a management function execution request to another agent device decided by said agent identification device, means of executing a required enhanced operational object when another agent device requires executing a management function, and means of transmitting and receiving an enhanced operational object between agent devices.

14. The agent device with program reception function of claim 13, wherein said agent identification device comprises:

retrieval rule evaluation means for storing a retrieval rule for identifying an agent device and network information for evaluating said retrieval rule, identifying an agent device to which a program is transmitted using said retrieval rule and, if necessary, said network information, and outputting the identifier of an identified agent device; and communication address retrieval means for storing conversion information in which the correspondence between said identifier and a communication address is described, and deriving the communication address of an agent device to which a program is next transmitted, using said identifier and said conversion information input from said retrieval rule evaluation section.

15. The agent device identification device with program reception function of claim 14, wherein said network information includes network configuration information being physical location information between transmitters, an inclusion relation of a managed object, and pointer information indicating other managed object held by a managed object.

16. The agent device identification device of claim 14, wherein said retrieval rule is a program for outputting a distinguished name for identifying an agent device which next transmits a management function execution request and a parameter needed when a target agent device executes a required management function, based on a relation between managed objects used in a management function.

17. An agent device with program reception function, comprising:

a program execution information storage section for storing an enhanced operational object which realizes management functions in a network management to provide said management functions to a program and a primitive operational object which provides a function of accessing a managed object, to said enhanced operational object;

a program execution section having means of executing a program transmitted from a manager, means of linking an enhanced operational object required by said program during a program execution to said program, and means of transmitting an execution result of said program to said manager;

a management information storage section for storing said managed object;

an agent identification device for identifying another agent device transmitting an execution request of said management function when said enhanced operational object needs to transmit a management function execution request to said agent device; and a remote function execution section having means of issuing a management function execution request to another agent device decided by said agent identification device and means of executing a required enhanced operational object when another agent device requires executing a management function.

18. The agent device with program reception function of claim 17, wherein said agent identification device comprises:

retrieval rule evaluation means for storing a retrieval rule for identifying an agent device and network information for evaluating said retrieval rule, identifying an agent device to which a program is transmitted by using said retrieval rule and, if necessary, said network information, and outputting the identifier of an identified agent device; and communication address retrieval means for storing conversion information in which the correspondence between said identifier and a communication address is described, and deriving the communication address of an agent device to which a program is next transmitted, using said identifier and said conversion information input from said retrieval rule evaluation section.

19. The agent device identification device with program reception function of claim 5, wherein said network information includes network configuration information being physical location information between transmitters, an inclusion relation of a managed object, and pointer information indicating other managed object held by a managed object.

20. The agent device identification device of claim 18, wherein said retrieval rule is a program for outputting a distinguished name for identifying an agent device which next transmits a management function execution request and a parameter needed when a target agent device executes a required management function, based on a relation between managed objects used in a management function.

21. An agent device identification device, comprising:

a retrieval rule evaluation section for storing a retrieval rule for identifying an agent device and network information for evaluating said retrieval rule, and identifying an agent device to which a program is transmitted, by using said retrieval rule and, if necessary, said network information, and outputting an identifier of an agent device identified; and a communication address retrieval section for storing conversion information in which a correspondence between said identifier and an communication address is described, and for deriving a communication address of an agent device to which a program is next transmitted, by using said identifier and said conversion information input from said retrieval rule evaluation section.

22. The agent device identification device of claim 21, wherein said network information includes network configuration information being physical location information between transmitters, an inclusion relation of a managed object, and pointer information indicating other managed object held by a managed object.

23. The agent device identification device of claim 21, wherein said retrieval rule is a program for outputting a distinguished name for identifying an agent device which next transmits a management function execution request and a parameter needed when a target agent device executes a required management function, based on a relation between managed objects used in a management function.

* * * * *

UNITED STATES PATENT AND TRADEMARK OFFICE
CERTIFICATE OF CORRECTION

PATENT NO. : 6,085,240
DATED : July 4, 2000
INVENTOR(S) : M. Suzuki, et al.

Page 1 of 1

It is certified that error appears in the above-identified patent and that said Letters Patent is hereby corrected as shown below:

Title page,
After "[22]" insert the following: -- [30] Foreign Application Priority Data Aug. 8, 1997 [JP] Japan.........9-214355 --

Column 1,
Line 62: "It is" should not being new paragraph.

Column 11,
Line 27: "PO" should read -- PO1 --

Column 12,
Line 3: "PO" should read -- PO1 --
Line 42: "Then" should not begin new paragraph.

Signed and Sealed this

Twenty-first Day of August, 2001

Attest:

*Nicholas P. Godici*

NICHOLAS P. GODICI
*Attesting Officer*  *Acting Director of the United States Patent and Trademark Office*